United States Patent
Speer

(10) Patent No.: US 9,120,562 B2
(45) Date of Patent: Sep. 1, 2015

(54) AIRCRAFT WINGLET DESIGN HAVING A COMPOUND CURVE PROFILE

(75) Inventor: Stephen R. Speer, Coeur d'Alene, ID (US)

(73) Assignee: Aerostar Aircraft Corporation, Hayden Lake, ID (US)

( * ) Notice: Subject to any disclaimer, the term of this patent is extended or adjusted under 35 U.S.C. 154(b) by 0 days.

(21) Appl. No.: 13/319,220

(22) PCT Filed: May 5, 2010

(86) PCT No.: PCT/US2010/033798
§ 371 (c)(1),
(2), (4) Date: Nov. 7, 2011

(87) PCT Pub. No.: WO2010/129722
PCT Pub. Date: Nov. 11, 2010

(65) Prior Publication Data
US 2012/0049010 A1 Mar. 1, 2012

Related U.S. Application Data

(60) Provisional application No. 61/175,691, filed on May 5, 2009.

(51) Int. Cl.
*B64C 3/58* (2006.01)
*B64C 23/06* (2006.01)

(52) U.S. Cl.
CPC ............ *B64C 23/065* (2013.01); *Y02T 50/164* (2013.01)

(58) Field of Classification Search
CPC .......... B64C 23/065; B64C 3/10; B64C 3/14; B64C 3/58; B64C 2003/146; B64C 2003/147
See application file for complete search history.

(56) References Cited

U.S. PATENT DOCUMENTS

| 5,275,358 A | 1/1994 | Goldhammer et al. |
| 5,348,253 A | 9/1994 | Gratzer |

(Continued)

FOREIGN PATENT DOCUMENTS

GB WO2008155566 A 12/2008

*Primary Examiner* — Tien Dinh
*Assistant Examiner* — Richard R Green
(74) *Attorney, Agent, or Firm* — Barry G. Magidoff; Paul J. Sutton

(57) ABSTRACT

An improved winglet design is presented for aircraft wherein the winglet configuration is well suited for aircraft wings having moderate to no aft swept, or wings having forward swept. The winglets (302) are located at the outer end of each wing (300) and curve upwardly as they extend outwardly from their intersection (304) with the wings (300). The curvature profile (303) of the winglets (302) when viewed from the rear (or front) of the aircraft at least approximates a specified curve profile made up of more than one curved section, e.g. the winglet trailing edge profile (305) having a perpendicular projection onto a plane normal to the winglet inner or root chord (342), said projection creating a winglet profile curve approximating a compound curve composed of two arc segment (306, 307). The two arc segments are tangent to each other at there point of connection (306b, 307a) wherein the arc segment (306) at the lower portion of the winglet connects to the outer end of the wing (300) and is tangent with the wing's reference plane (331). This lower arc segment (306) of the winglet profile connects to and is tangent with a second and arc segment (307) forming the profile of the upper portion of the winglet (302). A unique design specification for the plan form or developed shape of the winglet that is suitable for wings having nominal (less than 15 degrees) aft sweep, or have neutral, or forward sweep is also provided.

14 Claims, 28 Drawing Sheets

(56) References Cited

U.S. PATENT DOCUMENTS

| | | | |
|---|---|---|---|
| 6,484,968 B2 * | 11/2002 | Felker | 244/91 |
| 6,722,615 B2 * | 4/2004 | Heller et al. | 244/199.4 |
| 6,886,778 B2 * | 5/2005 | McLean | 244/45 R |
| 7,971,832 B2 * | 7/2011 | Hackett et al. | 244/199.4 |
| 2007/0131821 A1 * | 6/2007 | Johan | 244/91 |
| 2009/0084904 A1 * | 4/2009 | Detert | 244/199.4 |
| 2010/0181432 A1 * | 7/2010 | Gratzer | 244/199.4 |
| 2011/0024573 A1 * | 2/2011 | Kirk et al. | 244/199.4 |

* cited by examiner

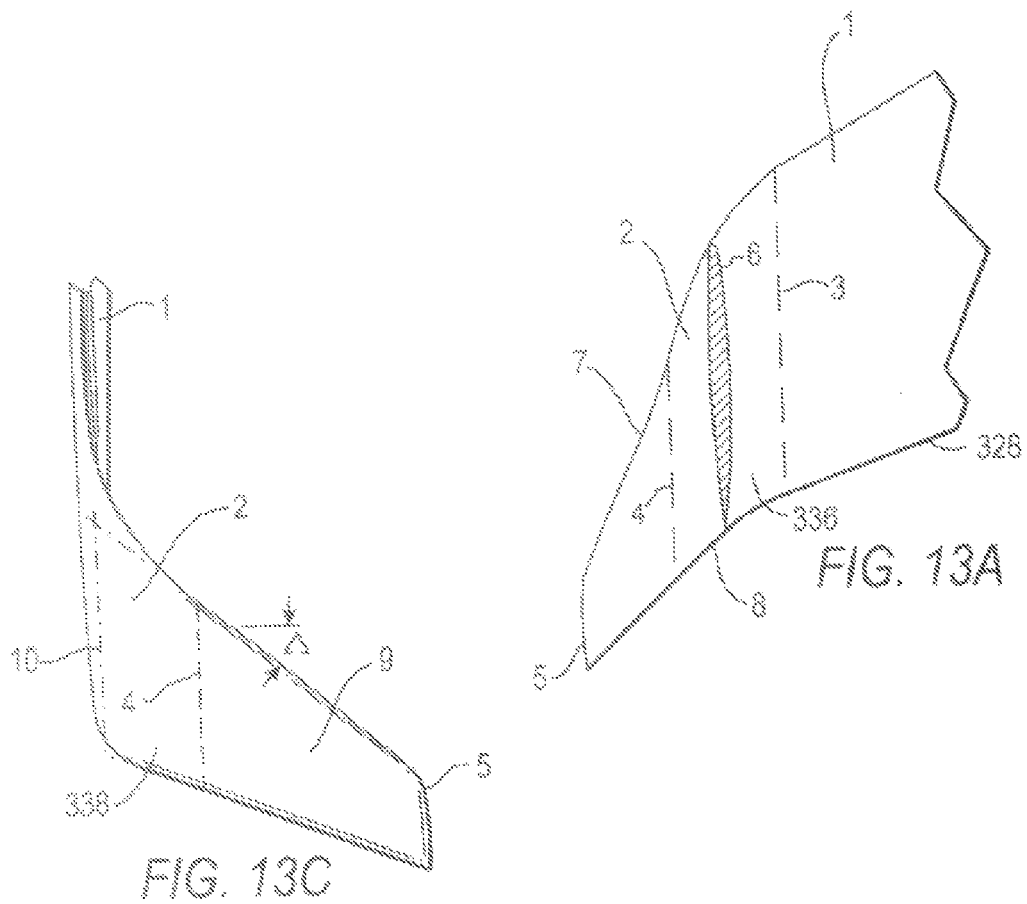
FIG. 13A
FIG. 13C
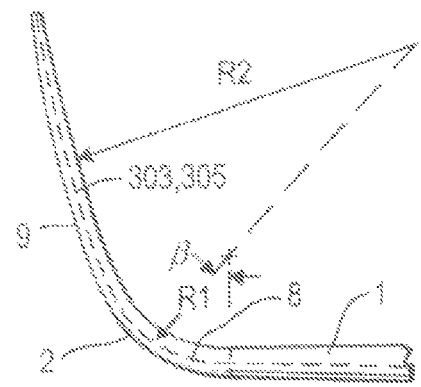
FIG. 13B

AIRCRAFT WINGLET DESIGN HAVING A COMPOUND CURVE PROFILE

TECHNICAL FIELD

This invention relates to winglets adapted to reduce the induced drag created by an aircraft's wings when they create lift. More particularly, it relates to the provision of a winglet having leading and trailing edges that are curved along their entire lengths, from where the winglet joins the outer end of the wing (the "wing tip") out to its outer end or tip, but where the curvature changes along the lengths so that the lines of the leading and trailing edges at least closely approximate two different arc segments or two different conic segments (or a combination of arc and conic segments), and where the two segments are connected at a point of tangency to each other.

BACKGROUND OF THE INVENTION

Lifting surfaces (wings) create drag when they create lift. This drag-due-to-lift is called "induced drag." A significant portion of the induced drag is attributed to the magnitude of the vortex induced at the tip of each wing. Over the years many devices have been proposed to reduce the strength of this tip vortex. Winglets, which are small lift generating surfaces placed at the tip of each wing, if designed properly, have been shown to significantly reduce this tip vortex thereby reducing the wing's induced drag.

The basic design and operational effectiveness of "winglets" is described in "A Design Approach and Selected Wind-Tunnel Results at High Subsonic Speeds For Wing-Tip Mounted Winglets", by Richard T. Whitcomb, NASA Technical Note TN D-8260, July, 1976. Some of the subsequent winglet construction designs in the patent literature are disclosed by U.S. patents: U.S. Pat. No. 4,017,041, granted Apr. 12, 1977 to Wilbur C. Nelson; U.S. Pat. No. 4,190,219, granted Feb. 26, 1980, to James E. Hackett; U.S. Pat. No. 4,205,810, granted Jun. 3, 1980, to Kichio K. Ishimitsu; U.S. Pat. No. 4,240,597, granted Dec. 23, 1990, to Roger R. Ellis, W. Martin Gertsen and Norman E. Conley; U.S. Pat. No. 4,245,804, granted Jan. 20, 1981, to Kichio K. Ishimitsu and Neal R. Van Devender; U.S. Pat. No. 4,714,215, granted Dec. 22, 1987, to Jeffrey A. Jupp and Peter H. Rees; U.S. Pat. No. 5,275,358, granted Jan. 4, 1994 to Mark I. Goldhammer and Karela Schippers; U.S. Pat. No. 5,348,253, granted Sep. 20, 1994 to Louis B. Gratzer; U.S. Pat. No. 5,407,153, granted Apr. 18, 1995 to Philip S. Kirk and Richard Whitcomb; U.S. Pat. No. 6,484,986 B2, granted Nov. 26, 2002 to Fort F. Felker; and U.S. Pat. No. 6,722,615 B2, granted Apr. 20, 2004 to Cierd Heller and Peter Kreuzer. A novel design having fully curved spiroidal shaped wing tip is presented in U.S. Pat. No. 5,102,068 granted Apr. 7, 1992 to Louis B. Gratzer.

FIGS. 1-7 reflect prior art concepts as shown in several of the above prior U.S. patents. FIGS. 1-4 reflect the disclosure in U.S. Pat. No. 5,275,358 (the "'358 patent"). Referring to FIG. 1, showing an entire aircraft (2) provides basic orientation for the terminology used herein. The aircraft basically comprises an aircraft body (4), left and right wings (6, 6A), and a tail section (8). A winglet (10, 110) is shown at the outer end of each wing (6). A fuselage coordinate system (X, Y, Z) is defined for the aircraft (2) in the following manner. A longitudinal axis (X) is defined to extend through the center of the aircraft body (4) in the fore and aft directions. Further, a vertical axis (Z) is defined in the up and down directions, while a transverse axis (Y) is defined in the left and right directions. The longitudinal axis (X), vertical axis (Z) and transverse axis (Y) are orthogonal to each other and meet at an origin located at the foremost plane of the aircraft (2).

A wing coordinate system (x, y, z) is defined wherein the wing coordinate system x axis is coincident with a reference wing chord, generally at the wing inner or root location, the wing coordinate system x axis being at an angle, alpha, about the fuselage Y axis from the fuselage coordinate system X-Y plane, said angle, alpha, defining the wing angle of incidence (note for wings incorporating airfoil section twist, the angle if incidence varies with wing span location along the wing coordinate system y axis), the wing coordinate system y axis is located at the forward end of the reference wing chord and is normal to the wing coordinate system x axis and at an angle, epsilon, about the fuselage coordinate system X axis from the fuselage coordinate system X-Y plane, said angle, epsilon, defining the wing dihedral angle, the wing coordinate system x-y plane defining a wing reference plane, the wing coordinate system z axis is normal to the wing coordinate system x-y plane.

Referring to FIGS. 2 and 3, a winglet (10) (from the right wing of the aircraft), which is generally composed of an upper sail or trapezoidal shape (16) and a lower transition shape (33), is joined to the wingtip (12) so that the winglet (10) extends outwardly and upwardly from the wingtip (12). The wingtip (12) (FIG. 2) has upper and lower wing surfaces (18) and (20), a wing leading edge (22), and a wing trailing edge (24). Similarly, the winglet (10) has upper and lower winglet surfaces (26) and (28), a winglet leading edge (30), a winglet trailing edge (32), and a wing/winglet intersection (14). Conventionally, the terms "upper" and "lower" used in reference to the winglet (10) generally corresponds to the "inner" and "outer" directions, respectively. This convention will be followed herein. The winglet (10) is generally described as having a lower transition section (33), adjacent to the wingtip region, and an upper sail or trapezoidal shaped section (34), distal from the wing. The leading edge (30) of the sail or trapezoidal section (34) is swept back at an angle (35) from the vertical z-axis. The sail section (34) is also canted at angle phi (36) from a plane parallel to the (x) and (z) axis (FIG. 3).

FIG. 4 is another example of the prior art and exemplifies an invention of the '358 patent. Here, the wing tip region is designated (112). Line (114) is where the wing reference plane (148) intersects the winglet upper or sail section reference plane (150). The wing (112) has upper and lower wing surfaces (118 and 120), a wing leading edge (122), a wing trailing edge and a wing root (not shown). The winglet (116) extends outboard and upward from the wing tip (112). The winglet (116) has upper and lower winglet surfaces (126 and 128), a winglet leading edge (130), a winglet trailing edge, a winglet root, and a winglet tip.

FIG. 5 is another example of the prior art and exemplifies an invention of the '253 patent and presents what is referred to as a "blended winglet", wherein the winglet profile is made up of an arc-line curve. Referring to FIG. 5, the winglet chord equals the wing tip chord at the attachment line (3). A winglet transition section (2) is bounded by the transition line (3) and a chordwise line (4) designating the transition end of the winglet (9). The nearly planar (slightly non-planar due to airfoil twist distribution) upper or sail portion of the winglet (9) has straight line profile from the transition end (4) to the tip (5). A feature of the FIG. 5 wing/winglet arrangement is a continuous monotonic chord variation bounded by a leading edge curve (7) and a trailing edge curve (8). These curves are tangent to the wing leading edge and trailing edge respectively at the winglet attachment line (3) and are also tangent to the leading edge and trailing edges respectively of the straight section (9) at line (4). The leading edge curve (7) is selected to provide a smooth gradual chord variation in the transition and also, to limit the leading edge sweep angle to less than about 65 degree. According to U.S. Pat. No. 5,348,253 this is necessary to avoid vortex shedding from the leading edge which would compromise the surface loading and thereby increase drag. The shape of the leading edge curve (7) is generally not critical but is selected to correspond to the airfoil chord and twist required to achieve optimum loading.

U.S. Pat. No. 5,348,253 also discloses that the rate of curvature R must be large enough to accommodate a continuous monotonic variation of cant angle in the transition section in order to allow the practical achievement of optimum aerodynamic loading and minimum interference between wing and winglet. The radius and curvature criteria is given by U.S. Pat. No. 5,348,253 and repeated below in terms of a parameter, Kr, having fairly narrow limits.

$$R/h=Kr*\cos(phi/2+pi/4)/\cos(phi)$$

where;

Kr=curvature parameter, where 0.35<Kr<0.5 (select lower limit if practical)

h=winglet height (normal to wing ref plane)

phi=cant angle of planar sail section 0<phi<40, and 140<phi<180 pi=3.14159

R=blend section (adjacent the wingtip section) radius

From the above equation, the curvature parameter Kr used in U.S. Pat. No. 5,348,253 is the ratio of the winglet arc section span increase (R*cos(phi)) to the length of the projection of the winglet height (as viewed in the wing yz plane) onto a plane rotated at an angle of (phi+90)/2 about the winglet tip. As shown in FIG. 6A, the length of this projection is h*cos((phi+90)/2), thus Kr=R*cos(phi)/(phi)/(h*cos((phi+90)/2)). More details regarding the arc-line blended winglet design are set forth in U.S. Pat. No. 5,348,253. The radius and curvature criteria as given by U.S. Pat. No. 5,348,253 and repeated here, shows that Kr was arbitrarily selected and has fairly narrow limits. Furthermore, when viewing all of these concepts, both for the prior art and for the present invention, that aircraft wings have a certain handedness, such that when discussing these issues it must be taken into account whether one is dealing with the left wing and left winglet, or the right wing and right winglet.

FIG. 6 is another example of the prior art and exemplifies an invention of the '253 patent. FIG. 6 depicts an embodiment of an elliptical profile winglet. Here, the outer end of the wing (200) meets the inner end of the winglet (202) at intersection (204). The major axis (206) of an ellipse is shown to extend perpendicular to the wing reference plane and to coincide with the intersection (204). The minor axis (208) of the ellipse extends perpendicular to the major axis and intersects the major axis at center (210). If one were to draw a diagonal line (212) from the center (210) to the outer end or tip (214) of the winglet (202), an acute angle (216) would be defined between the line (212) and the major axis (206). In FIG. 6, the dihedral angle of the wing (200) is designated (218). The winglet height is designated (220) and the winglet span is designated (222). The wing tip cant angle is designated (224). According to the invention, the winglet (202) curves upwardly and outwardly from intersection (204) to the outer end or tip (214) of the winglet (202).

U.S. Pat. No. 5,348,253 states that the winglet profile could be any continuous conic section with the winglet (202) preferably having a curvature in the y-z plane that at least approximates a sector of an ellipse measured from intersection station (204) outwardly to the winglet outer end or tip (214). At intersection station (204), the curvature of the winglet surfaces meets the wing surfaces substantially at a tangent. As the winglet (202) extends outwardly from the intersection station (204), its curvature in the y-z plane changes in substantially the same way that an elliptical surface changes

BRIEF SUMMARY OF THE INVENTION

According to this invention, the winglet trailing edge profile projection onto a plane normal to the winglet inner or root chord line is continually curved, i.e., the slope changes from point to point along the entire line, but approximates a curved line composed of at least two different curve segments, usually selected from curves formed from conic segments of different rho values, which can be two arc segments or two other conic segments, or a mixture thereof. The first curve segment closest to the wing, if an arc, has is center on an axis that is substantially perpendicular to the wing reference plane and substantially intersects the location where the outer, or tip, end of the wing is joined to the inner or root end of the winglet. The first curve segment begins at the wing tip, where it is tangent to the wing reference (x,y) plane, and extends though an angle beta (B), outwardly and upwardly from the wingtip, and has a defined rho value, or radius (if it is an arc), The second curve segment has a different rho value, or radius, R2, where R2>R1, and begins at the upper end of the first curve segment, which is a point where it is tangent to the first curve segment, and extends until it touches a tangent line that is parallel to a plane rotated about the winglet root chord (x) axis at angle phi relative to the wing z axis, and the rotation angle defines the winglet tip cant angle.

A reference curve defining the profile of the winglet extending from the wingtips of an aircraft can be generated from a curve through a locus of points having their location at specified percentage of the chord distance for each aerodynamic section profile of the winglet. If the distance along each aerodynamic section chord line is measured relative to the section trailing edge, then a curve through the locus of points a zero percent of each chord line would define the winglet trailing edge curve profile white a curve through the locus of points at 100 percent of the chord sections would define the winglet leading edge curve profile. For this invention, the reference curve used to define the shape of the winglet's profile is obtained from the perpendicular projection of a curve (through the locus of points described above) onto a plane normal to the winglet inner or root chord line.

Alternatively, the projection plane could be oriented perpendicular to the aircraft fuselage longitudinal axis or other orientation approximately perpendicular the aircraft's velocity vector. The preferred curve through the locus points described above being projected is the winglet trailing edge curve.

As is well understood, an arc is a section of a circle, which is also a member of the family of curves known as conic sections, i.e., which are formed by passing a plane through a double-napped cone. Based on the angle of this plane relative to the cone axis, there are four commonly named conic sections generated from said intersection. These are the hyperbola, parabola, ellipse and circle. Thus, the winglet projected profile curve could be composed of any two (or more) conic curved segments, wherein the inboard end of the first conic segment is tangent to the wing reference plane, as described above. Acceptable values for rho range from 0.4 to 0.7 with a value of 0.5 preferred.

Also within the scope of this invention are compound curve segments which are not limited to curves defined by conic curve segments, but which may be defined by a quadratic, cubic or other higher order equations. The critical design elements are that the curve length of the first curve segment must be of sufficient length to provide for the plan form or developed geometry described herein, specifically that the length of the curve is of sufficient length that the winglet's leading edge sweep angle in the transition section does not exceed maximum value described herein. Also the first, or lower curve must have constant or continually increasing radius of curvature, be approximately tangent to the wing reference plane (or plane perpendicular to the wind tip airfoil section plane and through the wing tip airfoil chord line) at the junction of the winglet to the wing tip, and be contiguous with, and approximately tangent to the second or upper curve defining the winglet sail section. The second or upper curve segment generally must also have constant or continually increasing radius of curvature, and have its lower end point connected to, and be approximately tangent to the first or tower curve's upper end. The upper end of the second or upper curve segment is positioned at the desired height above the wing reference plane as may be provided by the winglet plan form or developed shape described herein, and the upper end point of the second or upper curve segment is tangent to a line parallel with a line oriented at the specified cant angle, phi.

It must be noted that when referring to two curves being 'approximately tangent' to each other, this includes a blending region where any discontinuity is smoothed out to maintain a continuously curving profile, even where a mathematically pure tangency is not obtained.

It should be noted that where the first curved segment is not a constant radius curve, such as an arc, but rather has a constantly increasing radius, or rho value, for example a curve defined by a rho conic, this invention includes a winglet having a straight line segment, e.g., at the outermost end, approximately tangent to the first curve segment at the point of contact. For such configuration, the straight line segment should be parallel with a line oriented at the specified cant angle, phi, and if the line is the outer end of the winglet, the upper end of the line is located at the desired height above the wing reference plane.

Under certain circumstances, as where wing bending stress margins are low and the increase in bending loads applied by the winglet must be minimized, it is preferred that the first curve segment is a rho conic curve, quadratic equation curve, cubic equation curve, b-spline curve or other higher order curve, to reduce the winglet's half-span length.

Other objects, advantages and features of the invention will become apparent from the description of the best mode set forth below, from the drawings, from the claims and from the principles that are embodied in the specific structures that are illustrated and described.

BRIEF DESCRIPTION OF THE DRAWINGS

The winglet design in accordance with this invention will be described in more detail below with reference to the following accompanying figures:

FIG. 13A is a plan view of prior art wing/winglet combination of an arc-line blended winglet;

FIG. 13B is a rear view of the wing/winglet combination of the arc-line blended winglet of FIG.

FIG. 13C is a left view of the wing/winglet combination of the arc-line blended winglet of FIG.

DETAILED DESCRIPTION OF THE INVENTION

Figure 11A:
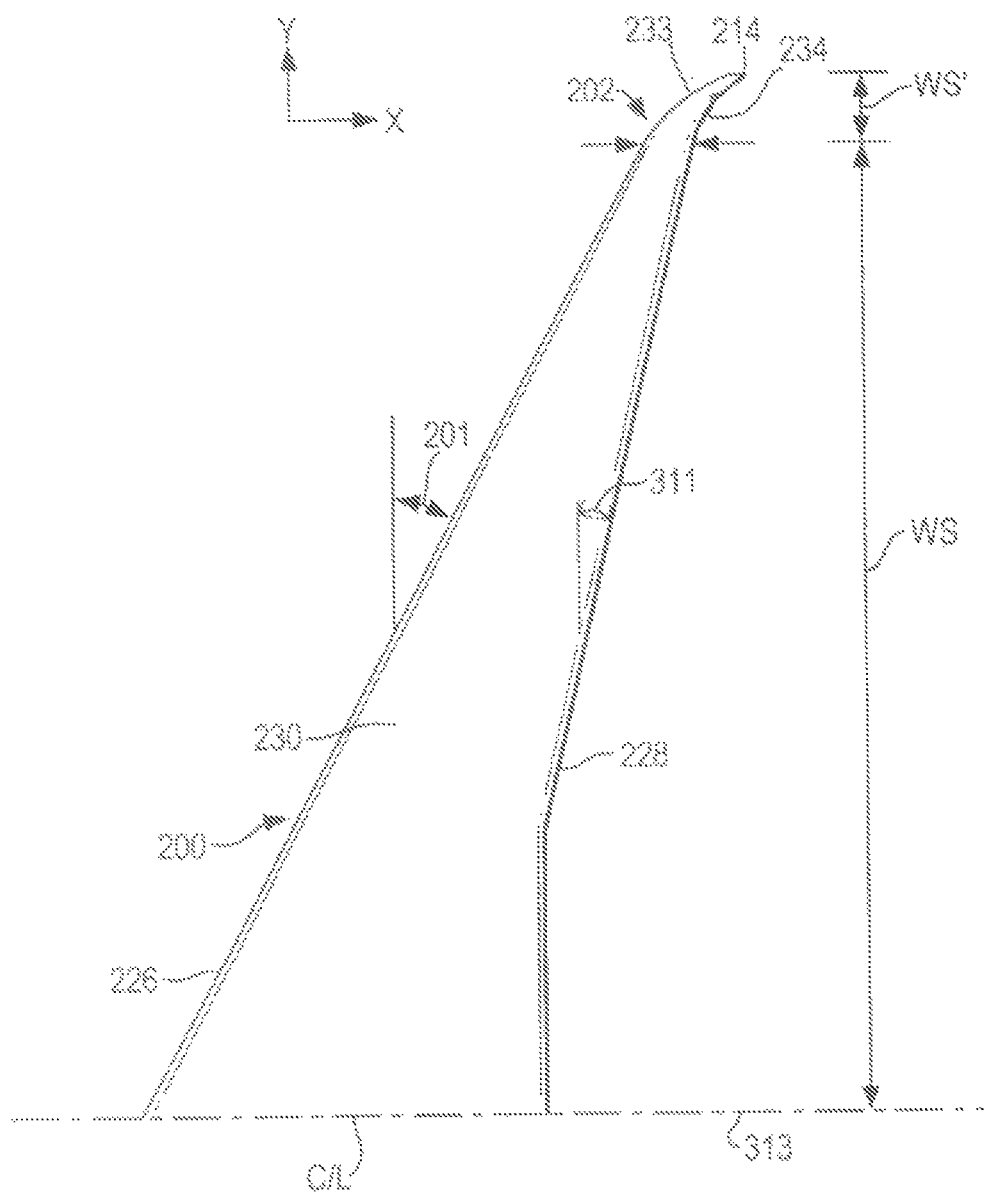
FIG. 11A is a top plan view of an aircraft wing of the prior art having large aft swept leading edge and a aft swept trailing edge for an aircraft with winglets.
Figure 11B:
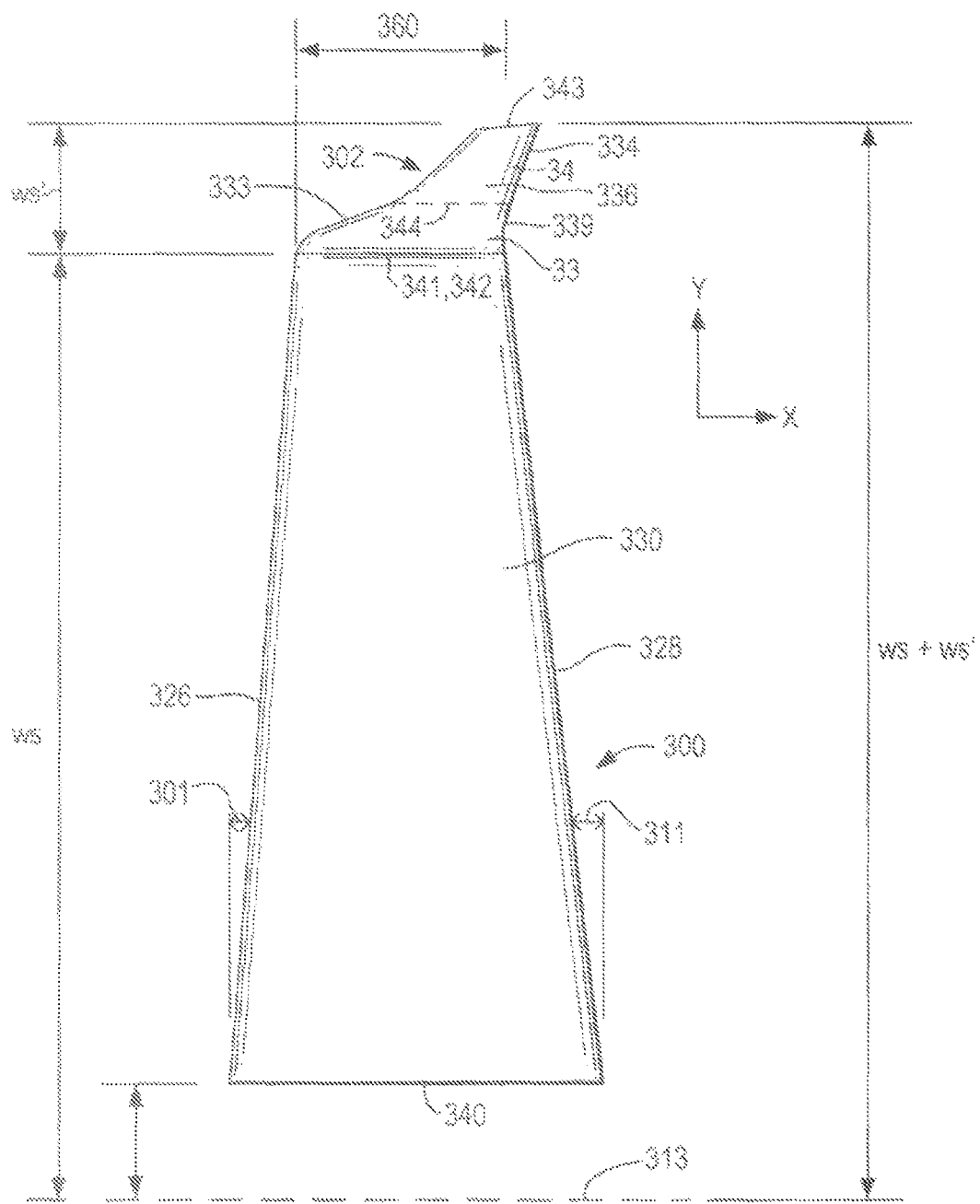
FIG. 11B is a top plan view of an aircraft wing having moderate aft swept leading edge and a forward swept trailing edge for an aircraft with winglets.

When discussing the present invention, it will be useful to obtain general definitions and references by referring to FIG. 11B. As shown, each wing (300) has an inner or root end (340), an outer or tip end (341), an upper surface (330), a lower surface (not shown), a leading edge (326) and a trailing edge (328). Each winglet (302) has an inner, or root, end (342), an outer or tip end (343), an upper surface (336), a lower surface (not shown), a leading edge (333) and a trailing edge (334). The inner or root end (342) of each winglet (302) is connected to the outer or tip end (341) of its wing (300). The upper (336) and lower surfaces of the winglets (302) and the leading (333) and trailing edges (334) of the winglets (302) are contiguous with the upper (330) and lower surfaces of the wing (300) and the leading (326) and trailing edges (328) of the wing (300).

Each winglet (302) follows a generally curved profile (333, 334) as it extends from its inner or root end (342), to its outer or tip end (343). A reference curve (303) defining the profile of the winglet can be generated from a curve through a locus of points having their location at specified percentage of the chord distance for each aerodynamic section profile of the winglet. If the distance along each aerodynamic section chord line (344) is measured relative to the section trailing edge (334), then a curve through the locus of points formed at a zero percent of each chord line would define the winglet trailing edge curve profile while a curve through the locus of points formed at 100 percent of the chord sections would define the winglet leading edge (333) curve profile. For this invention, the reference curve used to define the shape of the winglet's profile is obtained from the perpendicular projection of a curve (through the locus of points) described above onto a plane normal to the winglet inner or root chord line (342). Alternatively, the projection plane could be oriented perpendicular to the aircraft fuselage longitudinal axis or other orientation approximately perpendicular to the aircraft's velocity vector. The preferred curve through the locus points described above being projected is the winglet trailing edge curve (334).

Figure 8:
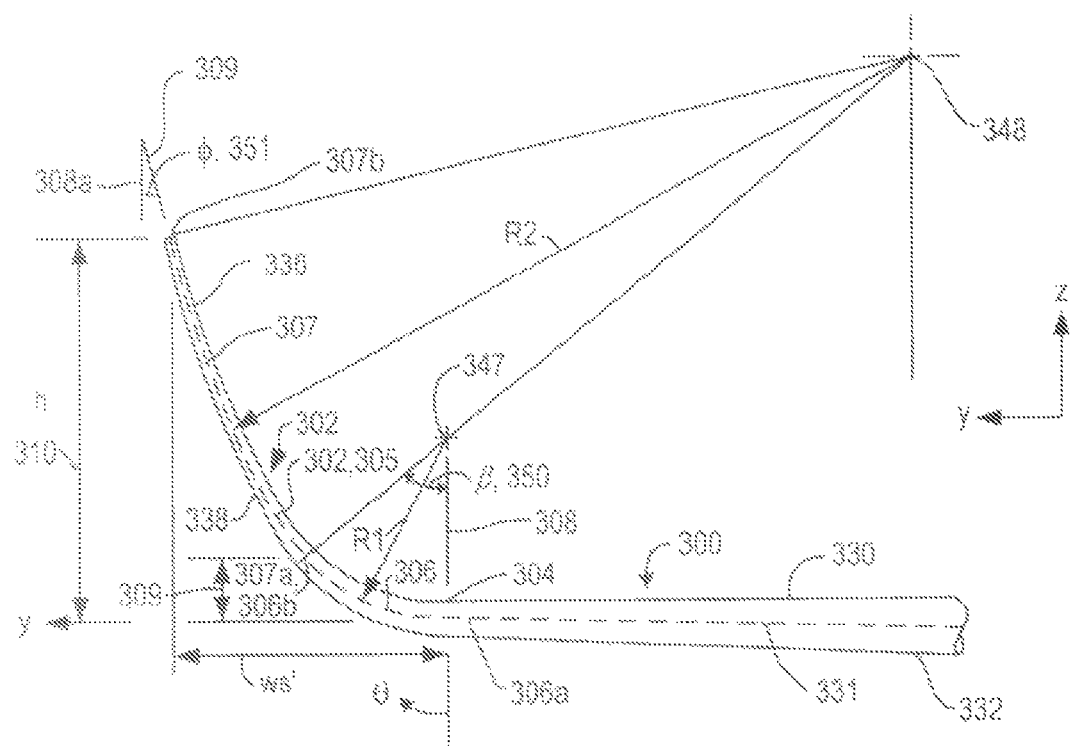
FIG. 8 is a front elevational view showing the compound curve (two radii) winglet profile of the invention.

According to this invention, referring to FIG. 8, the reference curve generated (303) from the winglet trailing edge profile (305) projection onto a plane normal to the winglet inner or root chord line (342), follows a curve approximating a curve composed of two arc segments wherein the first arc segment (306) has its center on an axis (308) that is substantially perpendicular to the wing reference plane (331) and substantially intersects the location where the outer or tip end (341) of the wing (300) is joined to the inner or root end (342) of the winglet (302). The first arc segment (306) has radius R1 and begins at the wing tip (304) and extends though an angle "β" (350), relative to axis (308) about point (347). The second arc segment (307) has radius $R_2$, where $R_2 > R_1$, and begins at the upper end (306b) of the first arc segment (306), where it is also tangent to the first arc segment (306), and extends until it touches a tangent line (309) to the second arc segment (307). That contact forms the cant angle (Φ,351), relative to axis (308a)

As is well understood, an arc is a section of a circle having a specified radius or a locus of points having a constant distance or radius from a reference point. An arc is also a member of the family of curves known as conic sections. Conic sections get their name from the fact that they can be formed by passing a plane through a double-napped cone. Based on the angle of this plane relative to the cone axis, there are four commonly named conic section curves generated from said intersection. These are the hyperbola, parabola, ellipse and circle. It is well known that the curves generated from conic sections can also be described by the general form of a second degree equation given by $$Ax^2 + Bxy + Cy^2 + Dx + Ey + F = 0$$

When using Computer Aided Design (CAD) software, rho conics are often used for aircraft design wherein the rho value of the conic curve defines its relative conic shape.

Generally, the value of the variable rho represents the location of a point at a rho proportional distance along a vector connecting a point mid way between the curve end points to the point of intersection of the specified end point tangent lines. A conic section curve with end point tangencies, as specified, is then placed though the specified end points and the intermediate rho defined point.

To fully define the rho conic curves, the end point locations and end point tangencies must also be specified. Of course, coordinates for an intermediate point along the conic curve can also be specified as an alternative to specifying a value for rho. Thus, the winglet projected profile curve could be composed of any two (or more) rho conic curved segments, wherein the inboard end of the first rho conic segment (306) is tangent to the wing reference plane (331) and begins at the point of intersection of axis (308) and the wing reference plane (331). The first curve segment (306) extends such that its outboard end point (306b) reaches a distance (309) above the wing reference plane (331) and where an angle from a line (308) perpendicular to the first rho conic curve at its outboard end point reaches a desired angle (β, 350) relative to axis (308).

The exemplified second rho conic curve segment (307) has its starting point (307a) at the upper end (306b) of the first curve (306), where it is also tangent to the first curve (306), and extends such that its outboard end point (307b) reaches a distance (h) above the wing reference plane (331). This distance h is determined at a point where a line 310 parallel to the axis (308) of the first curve is tangent to the second curve. This line 310 tangent to the second curve (307) at its outboard end point (307b) forms an angle (φ, 351) relative to the curve segment 307 at point 307b. Acceptable values for rho range from 0.4 to 0.7 with a value of about 0.5 being most preferred; the preferred range being between about 0.45 and 0.6.

It should be pointed out that the compound curve segments are not limited to curves defined by arc segments or conic curve segments; other curves, such as may be defined by a quadratic, cubic or other higher order equations are permissible. The critical design elements are that the curve length of the first curve segment must be of sufficient length to provide for the plan form or developed geometry described herein, specifically that the length of the curve is of sufficient length that the winglet's leading edge sweep angle in the transition section does not exceed the maximum value described herein, i.e., 65°. Also the first, or lower curve must have a constant or a continually increasing radius of curvature, be approximately tangent to the wing reference plane (or plane perpendicular to the wing tip airfoil section plane and through the wing tip airfoil chord line) at the junction of the winglet with the wing tip, and be contiguous with, and approximately tangent to the second or upper curve defining the winglet sail section, The second or upper curve segment generally must have constant or continually increasing radius of curvature, have its lower end point connected to, and be approximately tangent to the first or lower curve's upper end. The upper end of the second or upper curve segment is positioned at the desired height above the wing reference plane as may be provided by the winglet plan form or developed shape described herein, and the upper end point of the second or upper curve segment is tangent to a line parallel with a line oriented at the specified cant angle, φ.

It should be noted that the second segment could be a straight line and be within the present invention, with the resultant winglet being distinct from the prior art, provided the first curved segment was not an arc, or other constant radius curve. For this configuration, the line would be parallel with a line oriented at the specified cant angle, phi, and the upper end of the line would be located at the desired height above the wing reference plane. Comparisons of these winglet profile curves are illustrated in FIGS. 9A and 9B.

It may be desirable to utilize as the first curve segment a rho conic curve, quadratic equation curve, cubic equation curve, b-spline curve or other higher order curve in order to reduce the winglet's half-span length. This is particularly important in applications where wing bending stress margins are low and the increase in bending loads applied by the winglet must be minimized.

Figure 9:
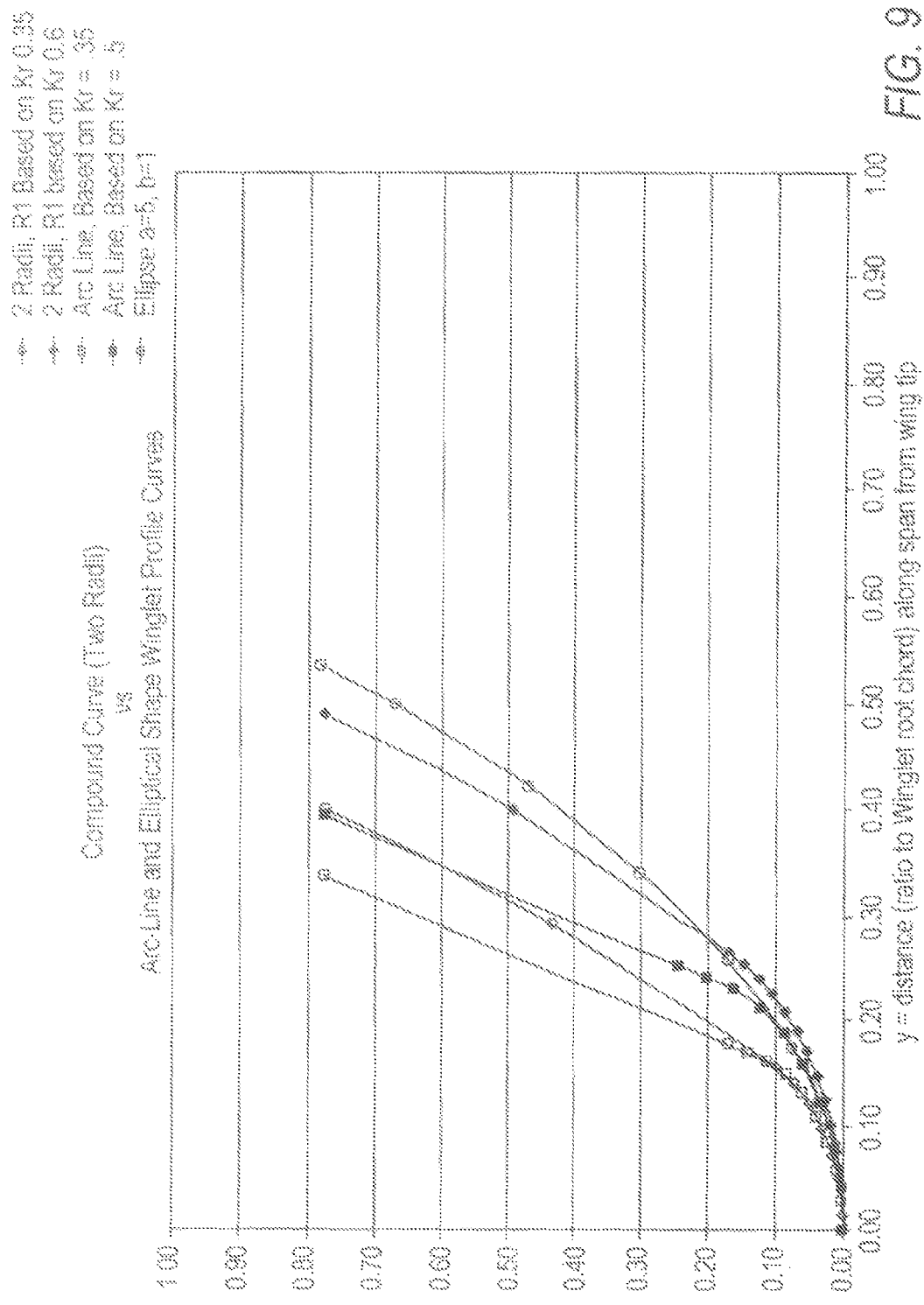
FIG. 9 is a front elevational graph comparing the winglet contours of the compound curve (two radii) winglet profile of this invention with the arc-line (U.S. Pat. No. 5,348,253), and the elliptical winglet (U.S. Pat. No. 6,484,968 B2) profiles of the prior art.
Figure 9A:
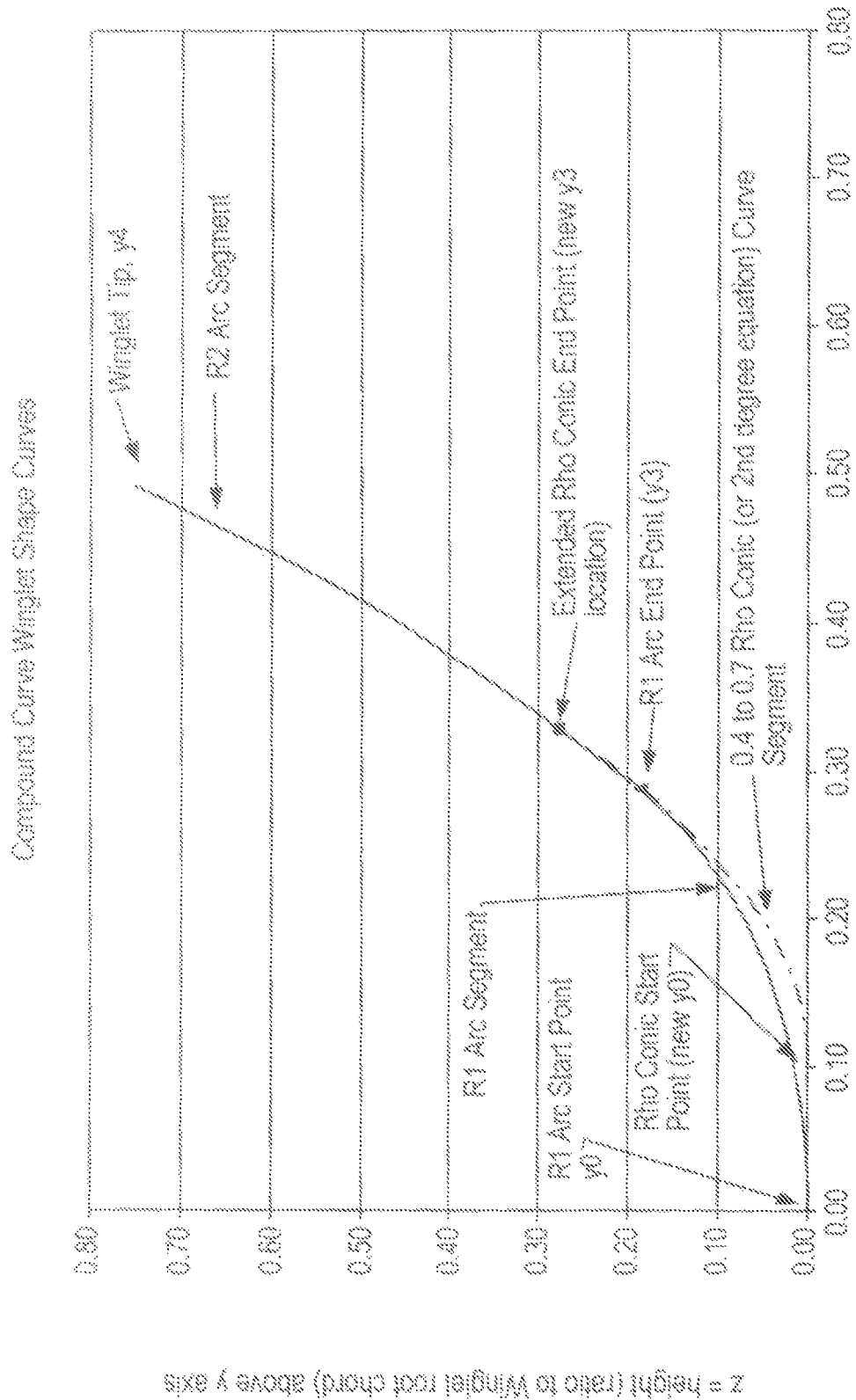
FIG. 9A is a front elevational graph comparing the winglet contours of the compound curve (two arc radii) winglet profile of this invention with another variation of this invention wherein the first or lower arc segment is replaced by a rho conic curve segment.
Figure 9B:
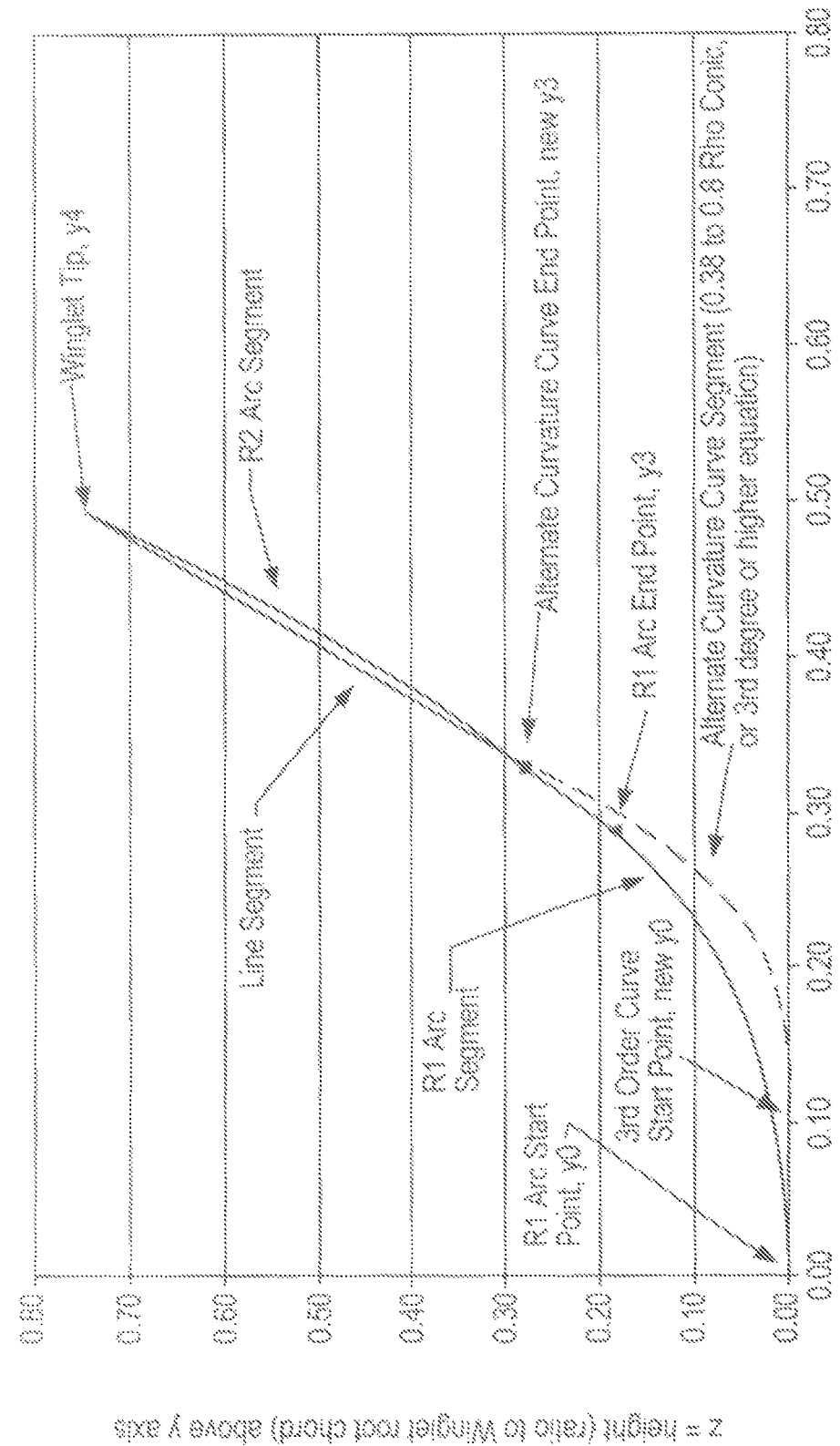
FIG. 9B is a front devotional graph comparing the winglet contours of the compound curve (two arc radii) winglet profile of this invention along with another variation wherein the first or lower arc segment is replaced by a higher order curve, such as a $3^{rd}$ order or cubic curve segment, and the upper arc segment is replaced by a line segment tangent to the higher order curve.
Figure 10:
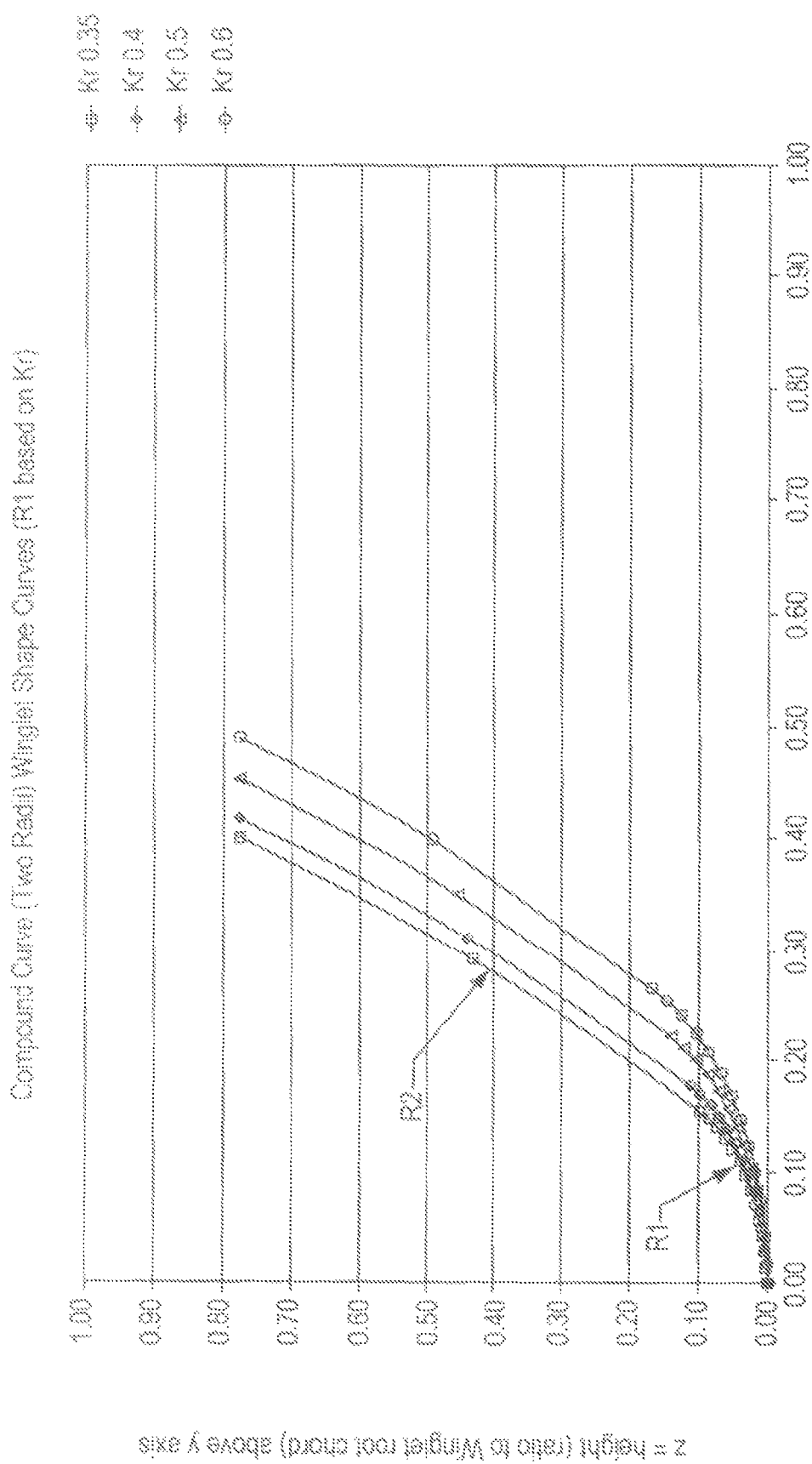
FIG. 10 is a front elevational graph comparing the winglet contours of the compound curve (two arc radii) winglet profile of this invention for various values of the design parameter Kr.

An example wherein the first curve segment is a rho conic curve is shown in FIG. 9a. In this illustration, the winglet half-span distance, measured as the ratio of the distance along the span to the length of the winglet root chord (y4-y0) is approximately 0.5. For this example, the rho conic curve (or other non-constant radius curve) allows the winglet attachment to the wing to be moved from y=0 to y=0.1 while maintaining end point tangencies, thus providing an approximate 20% reduction to the winglet half-span. If it is desired to maintain the same plan form or developed profile as laid out for the two arc segments design, the rho conic curve length would need to be extended to equal to the arc length of the R1 arc segment. This would position the y'3 coordinate at the same plan form location determined above for the two arc segment design. The location of the base of the sail section (at coordinate y3) in the non-developed would then move from the end point of the original R1 arc segment to the end point of the extended rho conic.

It should also be noted that a single, higher order curve, or other multiple segment contiguous curve, theoretically could be mathematically generated having a contour that closely matches any of the profiles described herein as being formed from two curve segments. Such a curve (or multiple composite curve) would be considered within the art defined herein if said alternate curve form conforms to the following criteria:
1) The lower end of the single, said alternate curve form is approximately tangent to the wing reference plane (or plane perpendicular to the wing tip airfoil section plane and through the wing tip airfoil chord line) at the junction of the winglet to the wing tip.
2) Said alternate curve form is approximately monotonic, with approximately constantly increasing radius of curvature from the curve lower end to the curve upper end.
3) The upper end point of the said alternate curve form is tangent to a line parallel with a line oriented at the specified cant angle, phi.
4) The upper end point of said alternate curve form is positioned at a height above the wing reference plane having a value of between 65 percent and 105 percent of the wing tip chord length and preferably about 75 to 80 percent of the wing tip chord length.
5) The location of the upper end of the transitions section or start or tower end of the sail section is positioned at a specified distance along the length of said alternate curve form measured from the lower end of the curve, said distance being approximately equal to the y'0 to y'3 distance described herein for the winglet developed profile.

For the two arc segment profile, the generally curved winglet (302) has a trailing edge profile (305) the projection of which onto a plane normal to the winglet inner or root chord line (342) is composed of two arc segments (306, 307) tangent to each other, wherein the first arc segment (306) at the lower portion of the winglet connects to the outer end of the wing (300) and is tangent with the wing's reference plane (331). This lower arc segment (306) of the winglet profile connects to and is tangent with a second arc segment (307) forming the upper profile of the winglet (302).

In preferred form, the winglet cant angle of the winglet profile curve, φ 351, at the winglet tip is between 5 and 30 degrees, preferably between 12 and 18 degrees, more preferably about 13-15 degrees, and most preferably about 14 degrees. The winglet height h (310), measured as the perpendicular distance from the wing reference plane (331) to the winglet tip (343, 307b), is between 65% to 95%, and preferably about 75% to about 85% and most preferably about 80%, of the wing tip chord length, or approximately 3% to 7% of the wing span (2*WS); the winglet upper trapezoidal plan form section, or sail section 34, has a leading edge sweep angle (373) of between 28 degrees to 38 degrees preferably about 32 to 36 degrees, and most preferably about 34 degrees; the transition section (33), the section between the wing tip (341) and the winglet sail section (34) has a sweep angle (372) of between 55 degrees and 65 degrees, more preferably about 58 to 62 degrees, and most preferably about 60 degrees; the winglet sail section (34) taper ratio is between 0.42 and 0.52, more preferably between 0.46 and 0.50, and most preferably about 0.48; the winglet tip chord (343) length is between 18% to 27% of wing tip chord length (340), more preferably between 21% to 25% of wing tip chord length and most preferably about 23% of such length.

The winglet tip (343) generally also incorporates a surface blend region (370) at the junction of the winglet leading edge (333) and winglet tip surfaces. This blend region (370) is incorporated to reduce flow separation from surface transition discontinuities and to provide a more esthetic shape to the winglet tip profile. This tip surface blend region (370) can be accomplished by adding new surfaces that extend the height of the winglet slightly, or by modifying the basic winglet (302) surfaces near the winglet tip.

Referring to FIG. 11B, the wing (300) has a sweep angle (301). The wing semi-span extending from the aircraft centerline (313) out to where the wing 300 meets the winglet 302 is designated WS. The increase in semi-span of the elliptical winglet described in U.S. Pat. No. 6,484,968 is designated WS'. As stated in U.S. Pat. No. 6,484,968, for the elliptical winglet profile the distance WS' is larger than it is in the prior art. Thus the overall wing plus winglet semi-span (WS+WS') will be substantially longer unless the wing semi-span (WS) is reduced. If the wing's semi-span is not reduced, the larger overall semi-span creates a significantly larger bending moment along the wing semi-span, which can require significant modifications to the wing structural. An advantage of the compound curves winglet (302) in this invention is that a continuously curved profile of a given height (310) can be designed with less increase in semi-span (WS') as compared to a profile derived from a single elliptical (or other single conic) curve; thereby reducing the increase in wing bending moment generated by the winglet (302). If sufficient strength margins in the wing (300) are present or provided in a new design, then the advantages of an increase in semi-span (WS+WS') attributed in U.S. Pat. No. 6,484,968 to an elliptical profile could be provided by simply increasing the wing semi-span (WS) inboard of the winglet such that the total span distant (WS+WS') to the tip of the compound curve winglet (302) described in this invention is the same as that of the elliptical (or other single conic profile) winglet described in U.S. Pat. No. 6,484,968. The alternate hyperbola single conic curve profile discussed in U.S. Pat. No. 6,484,968 will result in an even larger increase in span (WS') compared to the elliptical profile for the same tip cant angle phi (36), thus wing bending moment will be increased unless there is more reduction in the wing semi-span (WS). The parabolic single curve profile discussed in U.S. Pat. No. 6,484,968 will have a smaller increase in span (WS') compared to the elliptical profile for the same tip cant angle phi (36); however, the rate of change in curvature with increasing span is greater for the parabolic single curve profile. Consequently, with only modest deviation from the elliptical profile, the slope of the parabolic single curve profile will reach the limiting tip cant angle, phi (36) value (10 to 30 deg) at a winglet height (220) that is to low to provide sufficient distance (y') to adequately layout the winglet developed profile such as described herein, or in prior art such as described in U.S. Pat. No. 5,348,253. The compound curve profile of this invention provides much more flexibility in the layout of the winglet developed profile while also providing a continuously curved profile.

Figure 1:
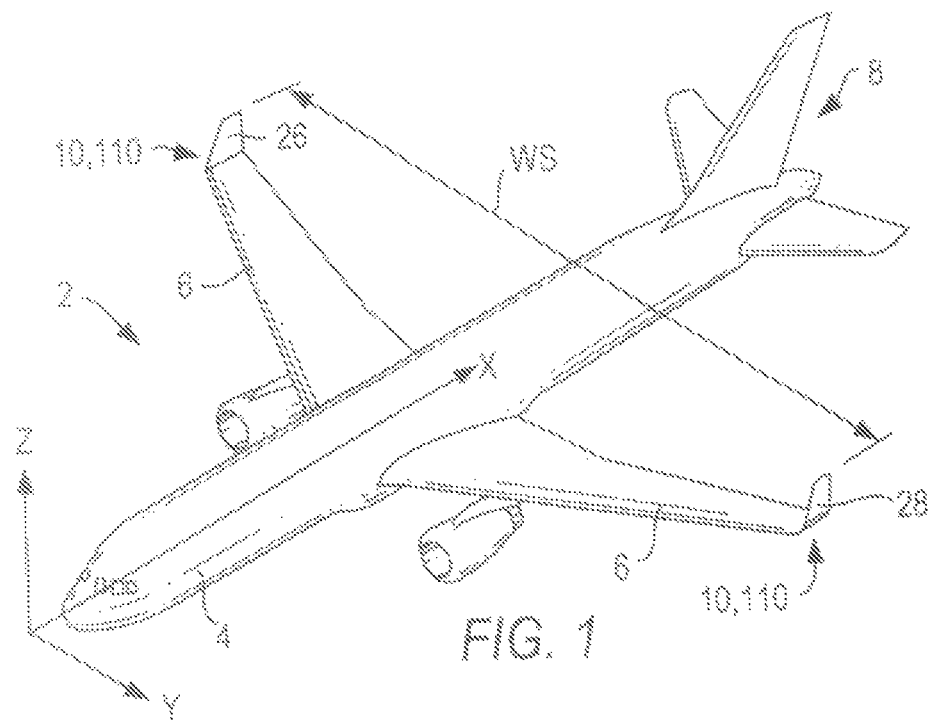
FIG. 1 is a pictorial view taken from above and looking towards the front, top and one side of a conventional modern aircraft that includes winglets on its wings.
Figure 2:
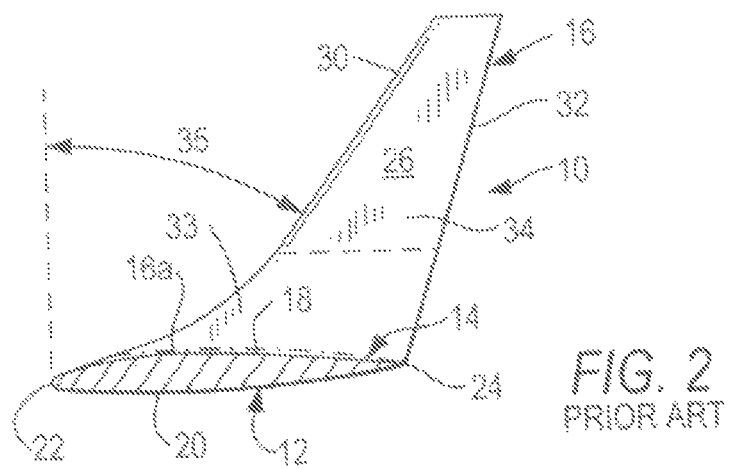
FIG. 2 is a cross sectional view taken through the right wing of FIG. 1, showing the main wing span in section and providing a side elevational view of a conventional winglet.
Figure 3:
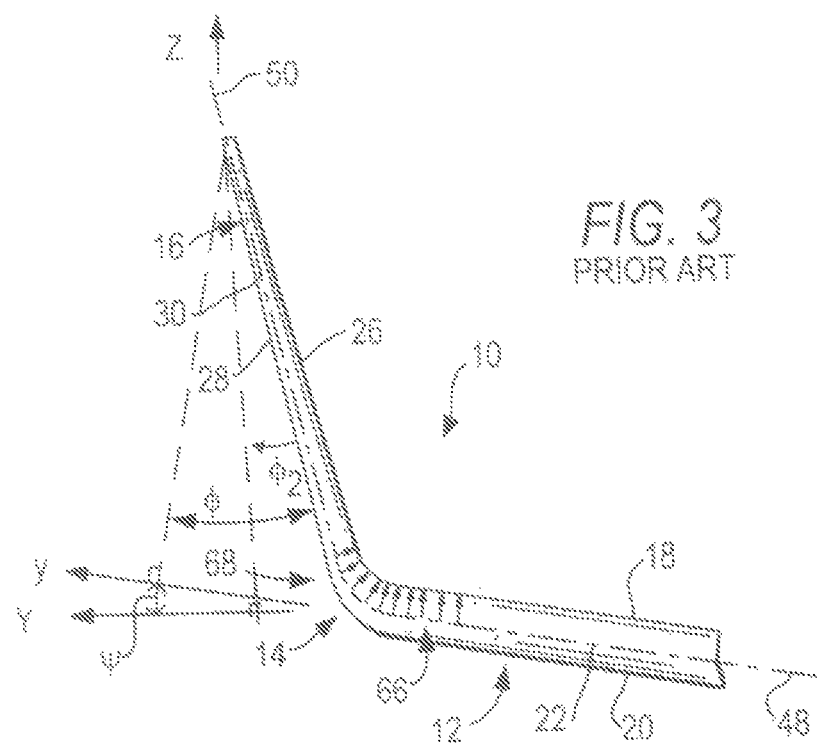
FIG. 3 is a fragmentary front devotional view of the winglet of FIG. 2 and enjoining portion of the main span of the wing.
Figure 4:
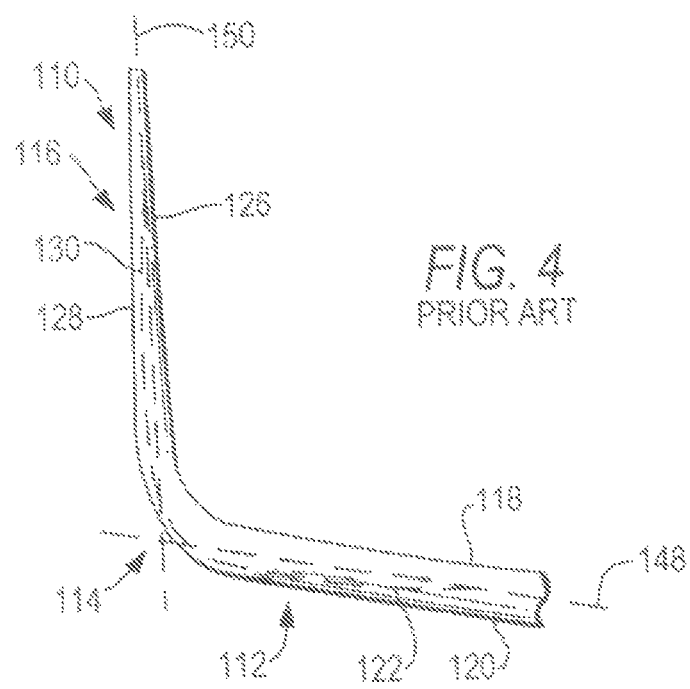
FIG. 4 is a view like FIG. 3, but of a different prior art winglet.
Figure 5:
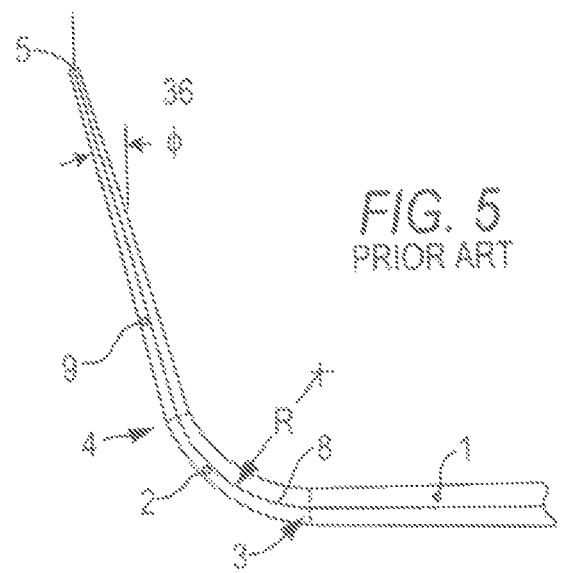
FIG. 5 is a view like FIGS. 3 and 4 but of the prior art arc-line blended winglet profile.
Figure 6:
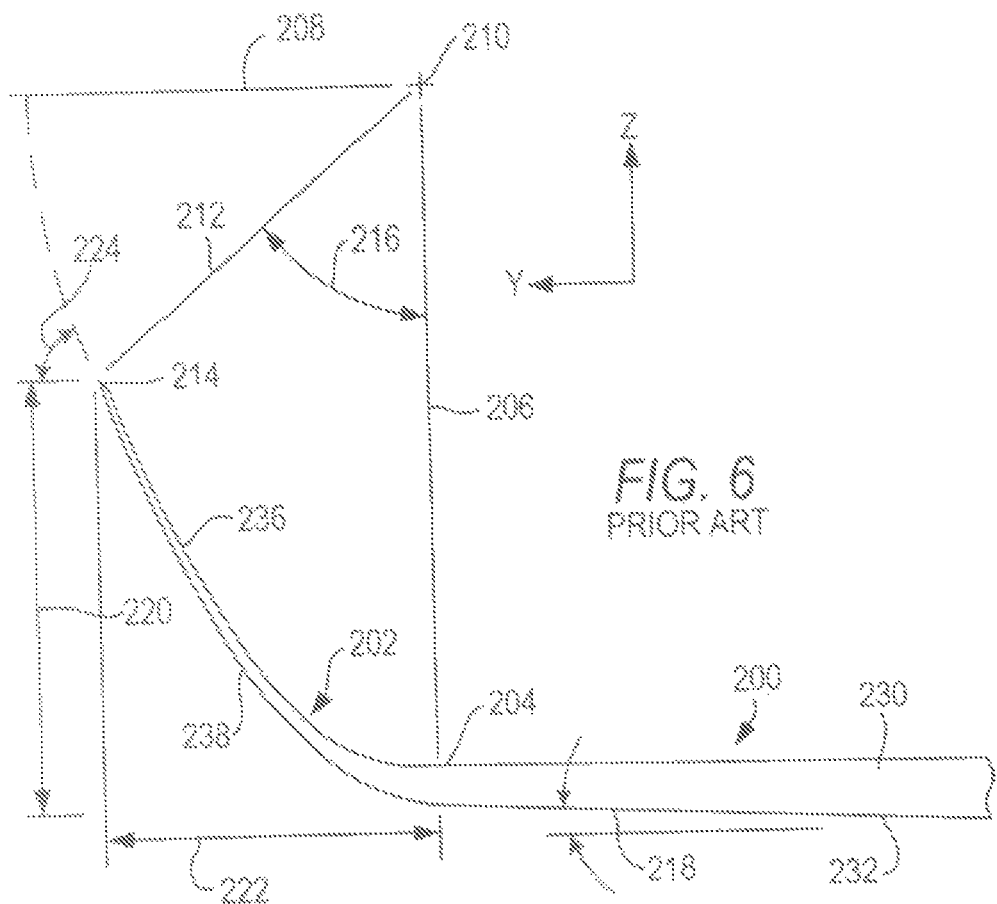
FIG. 6 is a view like FIGS. 3-5, but of a prior art elliptical profile winglet.
Figure 6A:
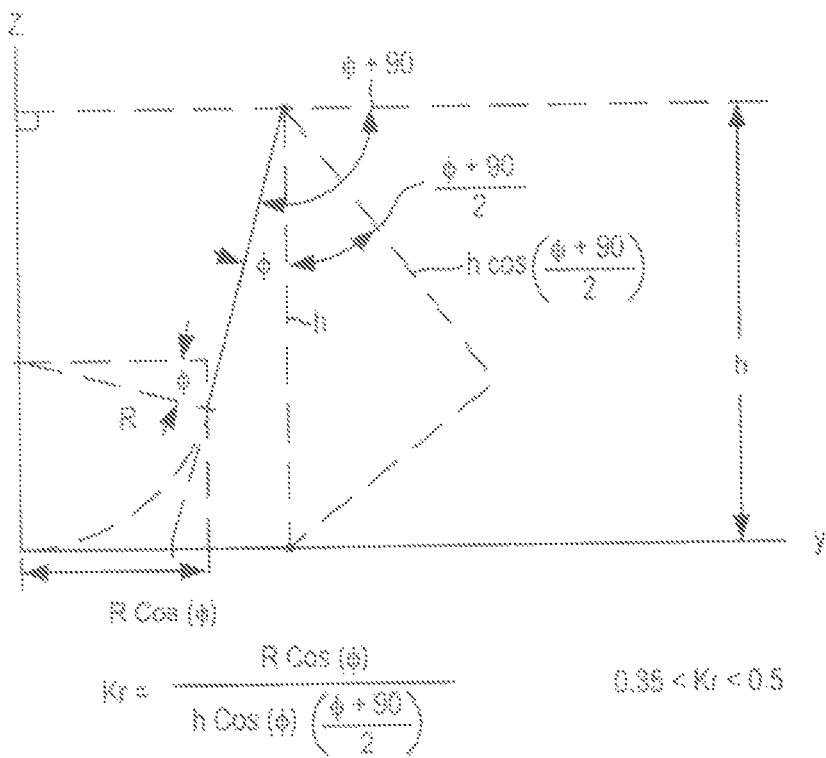
FIG. 6A is a cross sectional view taken through the left wing of FIG. 1, showing the main wing span in section and providing a side elevational view of a winglet, such view illustrating the prior art arc-line blended winglet profile of U.S. Pat. No. 5,348,253 and the geometic definition of the curvature parameter Kr.
Figure 7:
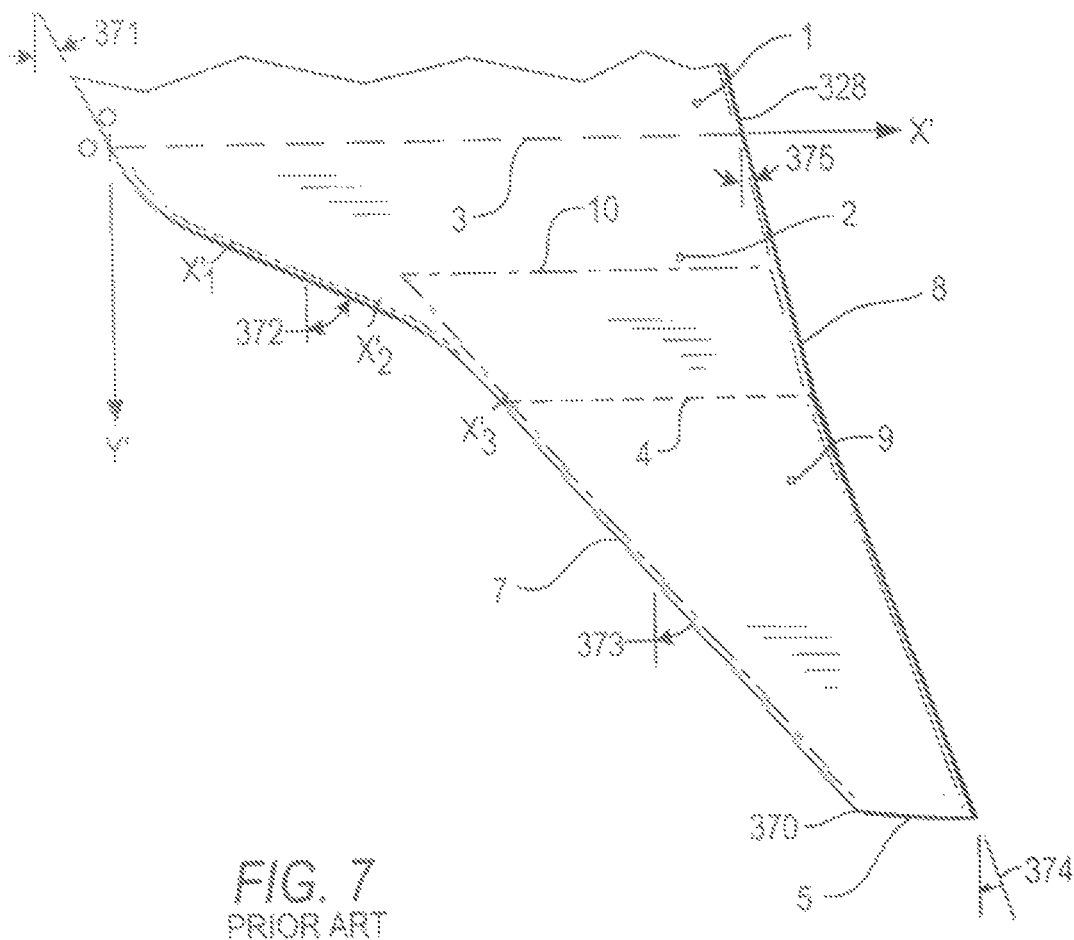
FIG. 7 is a developed view of the prior art arc-line blended winglet wherein the winglet surface is laid out flat on the x-y plane.

Another aspect of this invention relates to the developed or plan form layout of the winglet. U.S. Pat. No. 5,348,253 provides several design parameters that are intended to aid in the design of "optimized" winglet configurations; however the values for the design parameters provided U.S. Pat. No. 5,348,253 are directed toward applications involving highly aft swept wings typical of commercial airliners, see FIG. 7. The range in optimum value for the parameter provided in U.S. Pat. No. 5,348,253 are not necessarily optimum for aircraft wings with significantly less aft sweep, or for aircraft wings with neutral, of forward sweep. Highly aft swept wings provide a significant reduction in drag at higher mach numbers by delaying the onset of the wing's transonic region drag rise. However, highly swept wings also have aircraft handling and stall issues that make them less desirable for General Aviation aircraft. General Aviation aircraft are typically used for pleasure flying or business travel and the General Aviation sector does not have the pilot training requirements of the Commercial Aviation. Also Commercial aircraft often have expensive electronic equipment to improve aircraft stability and handling which are not economically practical for the General aviation market.

This invention provides alternate parameters to define in the plan form layout of winglets that are better suited for General Aviation aircraft or other aircraft having wings with only nominal (less than 15 degrees) aft sweep, or have neutral or forward swept. An example aircraft is the Aerostar model 600/700 series. The wing on this aircraft has a straight (no sweep, angle 301=0) leading that is perpendicular to the aircrafts longitudinal axis. As shown in FIG. 11B, the wings trailing edge (328) slopes forward wherein for highly aft swept wings, typically the wing trailing edge (328) also has an aft slope as shown Figure FIG. 7 and FIG. 11A. An exception would be the delta wing design used in many fighter aircraft wherein the wing's trailing edge (328) is typically straight but perpendicular to the aircrafts longitudinal axis.

U.S. Pat. No. 5,348,253 provides a coordinate reference system (y', x') for the winglet plan form or developed profile (see FIG. 7) that, for convenience, will also be used here. The winglet developed profile is constructed in the y'-x' plane, a plane that is parallel with the wing reference axis (leading edge 326) thru the wing tip chord line (341). The +y' direction is in the direction of increasing wing semi-span staring at the wing tip (341). The +x' direction in the aft direction parallel to the wing tip chord line (341) starting at the intersection of the wing leading edge curve (326) and the wing tip chord line (341). Some of the winglet plan form profile boundary point coordinate locations are as follows:

y0', x0'=Leading Edge Point on Chord Line of Winglet Root Section y0', x0"=Trailing Edge Point on Chord Line of Winglet Root Section y1', x1'=Leading Edge Point on Chord Line at Start of Winglet Transition Constant Sweep Section y1', x1"=Trailing Edge Point on Chord Line at Start of Winglet Transition Constant Sweep Section y2', x2'=Leading Edge Point on Chord Line at End of Winglet Transition Constant Sweep Section y2', x2"=Trailing Edge Point on Chord Line at End of Winglet Transition Constant Sweep Section y3', x3'=Leading Edge Point on Chord Line at Start of Winglet Sail (or trapezoidal) Section y3', x3"=Trailing Edge Point on Chord Line at Start of Winglet Sail (or trapezoidal) Section y4', x4'=Leading Edge Point on Chord Line at End of Winglet Sail (or trapezoidal) Section (Winglet Tip Section)

y4', x4"=Trailing Edge Point on Chord Line at End of Winglet Sail (or trapezoidal) Section (winglet Tip Section)

A procedure needs to be provided to determine the forward-aft location of the winglet sail or trapezoidal section relative to the wing geometry. A procedure to position the forward-to-aft location of the winglet sail or trapezoidal section (section from winglet location y'=y3' to the winglet tip y'=y4', region indicated by (9) in FIGS. 7, 13A, 13B, 13C, and (336) in FIGS. 8 and 11B) is determined from the point (337) of intersection of a projection of the wing's trailing edge (328) and the winglet chord at y3' (or an alternate chord position between y2' and y3'). The position of the winglet upper sail or trapezoidal section is located by positioning the winglet upper sail or trapezoidal section trailing edge line (334) (or extension thereof) such that it also intersects point (337). However, this location is not optimal for wings having trailing edges that have a forward (negative) sweep because the intersection point (337) of intersection can position the winglet's sail or trapezoidal section too far forward to accommodate the leading edge transition geometry described herein and in U.S. Pat. No. 5,348,253. Also the more forward location of the winglet sail section (y3' to y4') can have a negative impact on the wings torsion loading, flutter, and wing stall characteristics. Locating the winglet upper sail or trapezoidal section trailing edge line (334) (or extension thereof) such that it intersects point (337) also not optimal for wing trailing edges with high aft sweep because this intersection point (337) can position the winglet's sail or trapezoidal section too far aft. An excessive aft location of the winglet sail section (y3' to y4') also can have a negative impact on the wings torsion loading, flutter, and wing stall characteristics. The invention herein adds an offset parameter, G, specifying an offset displacement distance, Cx, as a ratio of the winglet root chord length, for the upper or sail section trailing edge aft for wings with a forward (negative sweep angle) swept trailing edge and forward for wings with an aft (positive sweep angle) swept trailing edge from the point of intersection (y3a', xw3") of a projection of the wing's trailing edge (328) and the winglet chord line (338) at y3a=y3' (or an alternate chord position between y0' and y3'). The trailing edge of the upper or sail section of the winglet is offset in the x' direction by the value of C. The magnitude of the amount of offset is within the range of Cx values determined by the following:

$Cx = G * CWroot$

Where: G=offset parameter
if gamma ($\gamma$)>10 deg (i.e. larger aft swept wing trailing edge)

$G = -H*((y3a'-y0')/CWroot)*\tan(\gamma-10)$

Where: 0.3<H<0.9, H=0.6 preferred
if 0<=$\gamma$<=10 deg (i.e. aft swept wing trailing edge up to 10 deg.)

$G = 0.$ if $\gamma$<0 deg (i.e. forward swept wing trailing edge)

$G = -H*((y3a'-y0')/CWroot)*\tan(\gamma)$, if $\gamma<0$

Where: 0.3<H<0.9. H=0.63 preferred
CWroot=Winglet Root Section Chord Length
Cx=Winglet Upper or Sail Section T.E. Aft Offset Displacement Distance as a ratio of the winglet root chord length, CWroot
gamma ($\gamma$)=wing trailing edge sweep angle, deg., measured relative to a plane normal to aircraft's longitudinal axis (XX)

A fillet curve (339) is added to the winglet's trailing edge plan form wherein the inboard end of the fillet curve (339) connects with and is tangent to the wing's plan form trailing edge (328) curve at the winglet root (342) and the outboard end of the curve connects with and is tangent to the winglet's sail (34) or trapezoidal section plan form trailing edge curve (334) at the location y3' (or an alternate projected position between y2' and y3').

The value of the offset parameter specifying the offset displacement distance factor, Cx, of the sail section aft from the point of intersection of a projection of the wing's trailing edge (328) and the winglet chord (338) at y3' (or an alternate projected position between y2' and y3') is dependent upon the wing trailing edge sweep angle (311), the winglet trailing edge sweep angle (373), the wing tip chord length (341), the winglet tip chord length (343), and the winglet sail section leading edge sweep angle (373). In the (preferred configuration, the value of the offset factor, Cx, will position the leading edge of the start of the sail section, point (y3', x3'), such that the value of x3' is between 40% and 60% of the winglet inner or root chord (x0"-x0'). A further objective of the offset parameter, G, is to provide sufficient distance from y'=0 to y'=y3' to layout the winglet transition section such that the winglet plan form transition section leading edge maximum sweep angle (372) is less than 65 degrees to avoid vortex shedding, and greater than 20 degrees to accommodate the desired winglet sail area.

As mentioned above, U.S. Pat. No. 5,348,253 also provides a guideline for determining the arc radius, R, of curvature used for the profile of arc-line blended winglets for highly swept wings based on the ratio R/h, From a perspective of the winglet profile, the primary difference between the profile presented in U.S. Pat. No. 5,348,253 and the profile presented in this invention is that profile in U.S. Pat. No. 5,348,253 is composed of an arc segment and a line segment, thus the profile is not continuously curved, where the invention described herein has a profile composed of two arc segments (or other conic segments) an is thus continuously curved. According to U.S. Pat. No. 5,348,253 the arc radius, R, is determined from the R/h ratio is calculated using the sail (trapezoidal) section cant angle phi (337) and a constant, Kr, where, for the optimum design, 0.35<Kr<0.5 with the lower value for Kr being preferred.

As discussed previously, Kr is a ratio of two somewhat arbitrary dimensional values to provide a means of specifying the winglet arc radius to height ration based on the cant angle, phi. Although a different dimension value ratio could be more convenient for the designing of the compound curve winglet described herein, for more direct comparison with the prior art, the same definition for Kr and method for the determination of the radius of the first (R1) or lower arc segment will be used. However, for winglets with compound curve segments as provided herein, limiting the Kr value to below 0.5, as stated in the prior art, would not provide sufficient plan form y axis coordinate distance to accommodate the transition section leading edge design parameters.

More specifically, there will not be sufficient distance in the y direction to keep the transition section maximum sweep angle (372) from exceeding the 65 degrees limit. For aircraft having wings with nominal (less than 15 degrees) aft sweep, or have neutral or forward swept, a Kr value above 0.5 to 0.8 is amore practical range with 0.65 preferred.

For the two arc compound curve profile (305) described above (center of R2 located inboard of the winglet tip) it is necessary to specify a method to determine the arc radius (R2) for the second arc segment.

R2 can be determined from the following equation:

$R2 = (h - R1*(1-\cos(beta)))/(\cos(beta)-\sin(phi))$

R2=Compound curve second (upper) section arc radius, R2>R1
R1=Compound curve first (tower) section arc radius R1/h=Kr*cos(phi/2+pi/4)/cos(phi)

Kr=first arc section curvature parameter, where 0.35<Kr<0.8 h=winglet height (normal to wing ref plane)

beta=arc segment angle (deg) for 1st or R1 arc segment, 25>beta<70 phi=cant angle (deg) of second arc section at winglet 5°>phi<30° pi=3.14159

For the two arc compound curve profile (305) described herein it is also necessary to specify end points the of both arc segments. For the first arc segment (306), the inboard end point (306a) is coincident with wing tip end plane at (304) and tangent to the wing reference plane (331). The upper, outer end point (306b) of the first arc segment (306) is defined by specifying angle beta (305) about the first arc segment center (347). Depending upon the desired winglet height (310), this angle beta (305) is generally greater than 25 degrees and less than 75 degrees, with 60 to 70 degrees being generally the preferred range.

As mentioned previously the arc length of the first arc segment (306) must be long enough to provide sufficient distance in the y' direction to keep the transition section maximum sweep angle (372) from exceeding the 65 degree limit. For the second arc segment (307), the inboard end point is coincident with and tangent to the upper, outboard end (306b) of the first arc segment. The upper, outboard end (307a) of the second arc segment (307) is determined from the desired winglet tip cant angle phi (351). Depending upon the angle (350) selected for beta, and the desired winglet height (310), the winglet tip cant angle phi (351) is generally greater than 5 degrees and less than 30 degrees, with 12 to 18 degrees being generally the preferred value. Equations for the y-z coordinates of the arc end points relative to the wing tip are as follows:

theta=outboard direction angle about radius (R1) center relative to the wing tip y-z plane, deg beta=value of theta at start of 2nd segment, deg if theta>=0, and <=beta, use following equations:

$R1$ arc center at $y=0, z=R1$

Distance along Wing Span from Wing Tip, $y=R1*\sin(\theta)$

Distance above Wing Reference Plane, $z=R1*(1-\cos(\theta))$ if theta>beta, use following equations:

$R2$ arc center at $y=(R2-R1)*\sin(\beta), z=(R2-R1)*\cos(\beta)+R1$

Distance along Wing Span from Wing Tip, $y=R2*\sin(\theta)-(R2R1)*\sin(\beta)$

Distance above Wing Reference Plane, $z=R2*(1-\cos(\theta))-(R2-R1)*\cos(\beta)$ Also;

Distance along Wing Span ($y$) to start of Winglet 2nd Arc Section $y3=R1*\sin(\beta)$ Height ($z$) from wing reference plane to start of Winglet 2nd arc Section $z3=R1*(1-\cos(\beta))$ Distance along Wing Span ($y$) to outboard end or Winglet 2nd Arc Section $y4=R2*\sin(90-\phi)-(R2-R1)*\sin(\beta)$ Height ($z$) from wing reference plane to outboard end of Winglet 2nd Arc Section $z4=h$, Height of Winglet$=R2*(1-\cos(90-\phi))-(R2-R1)*(1-\cos(\beta))$ It should noted that in the preferred design, the winglet sail section begins at location y3 and for the above geometry the arc length for the lower R1 arc segments is:

$R1$ Arc Length$=R1*$Beta$/57.2968$ for Beta in degrees

Figure 12:
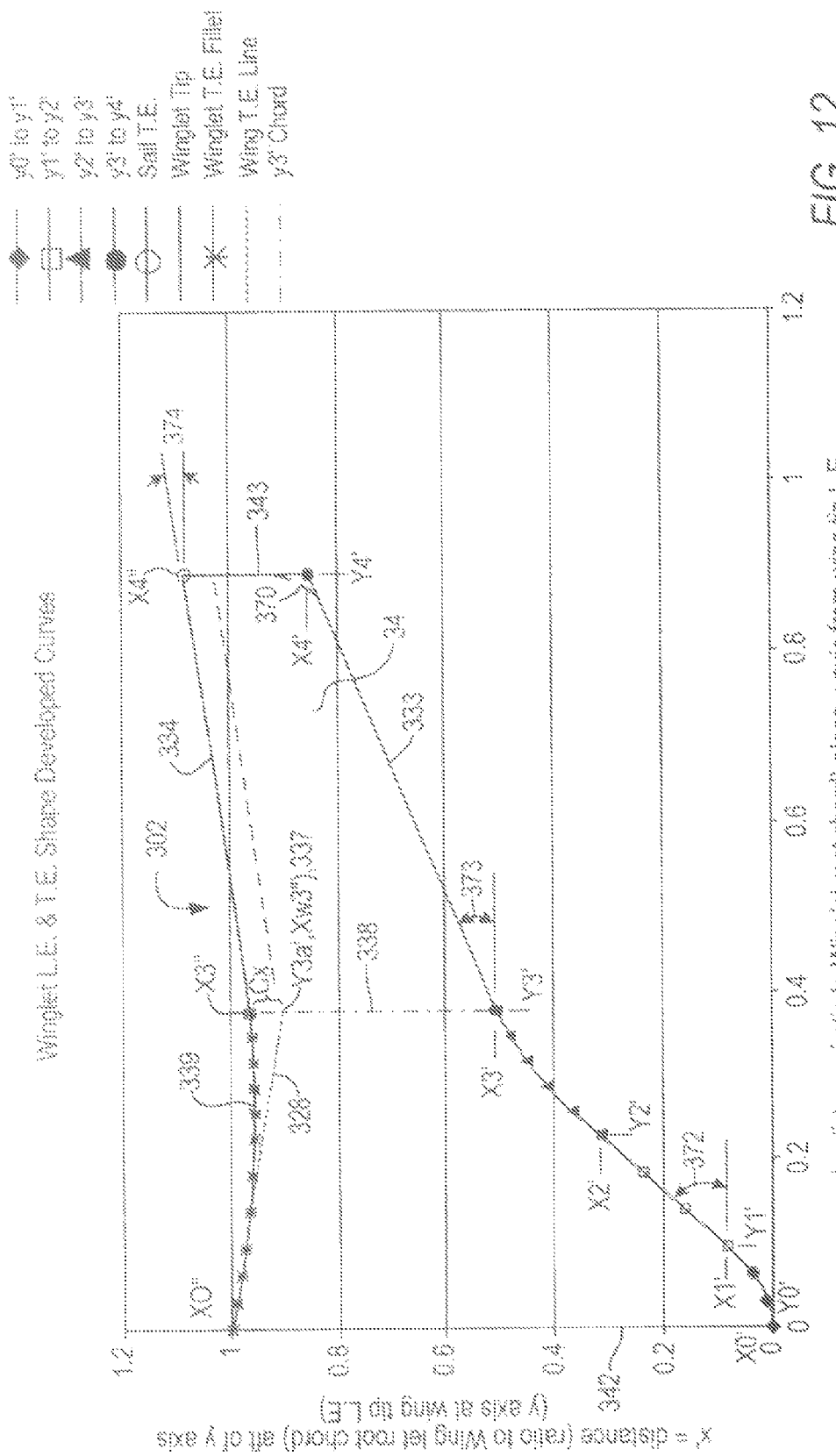
FIG. 12 is a developed view of the compound curve winglet of this invention wherein the winglet surface is laid out flat on the x-y plane, and the wing leading edge has no sweep and the trailing edge has a forward sweep.

This R1 arc length value is also the distance between y'0 to y'3 for the developed layout of the winglet shown in FIG. 12.

Figure 14:
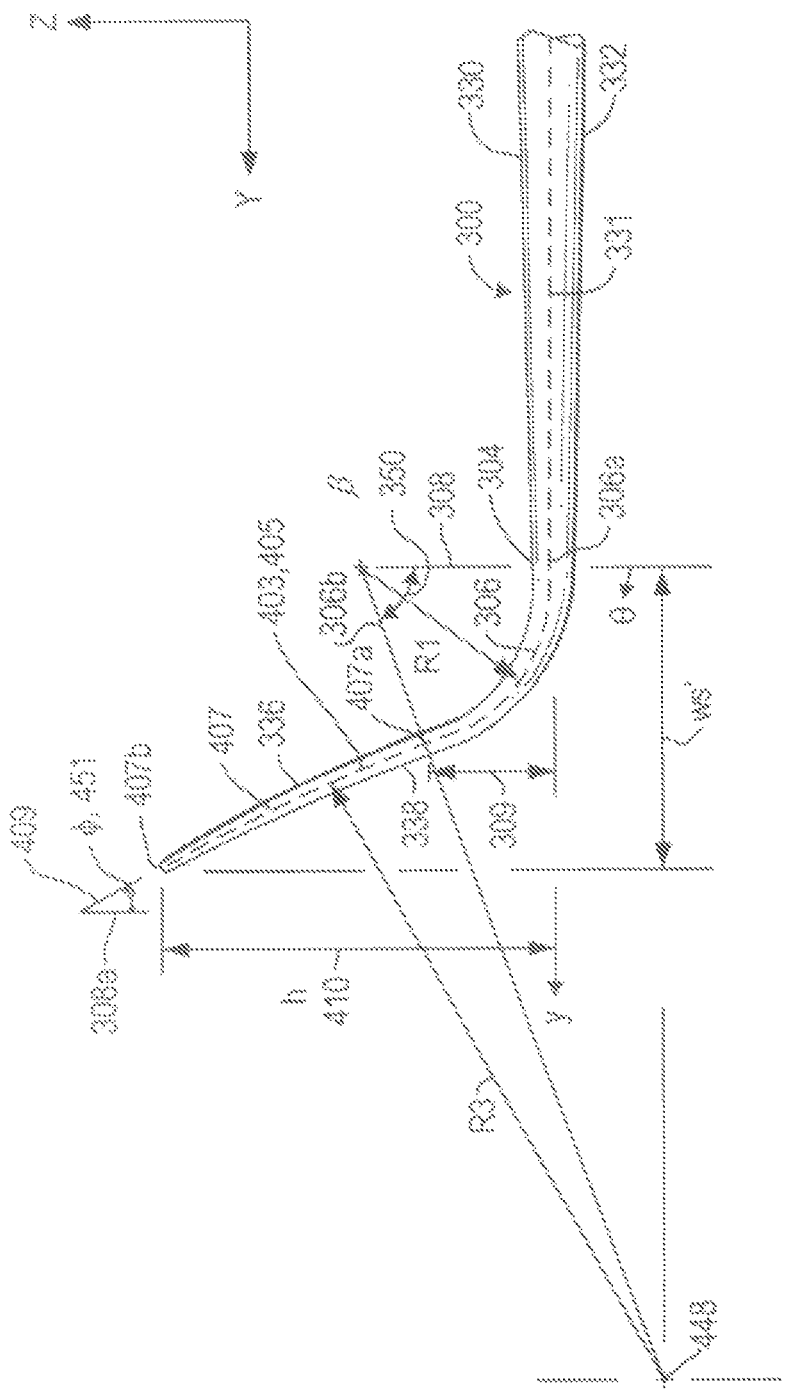
FIG. 14 is a front elevational view showing the compound curve (two radii) winglet profile of the invention where the curve contains a reflex in curvature.
Figure 15:
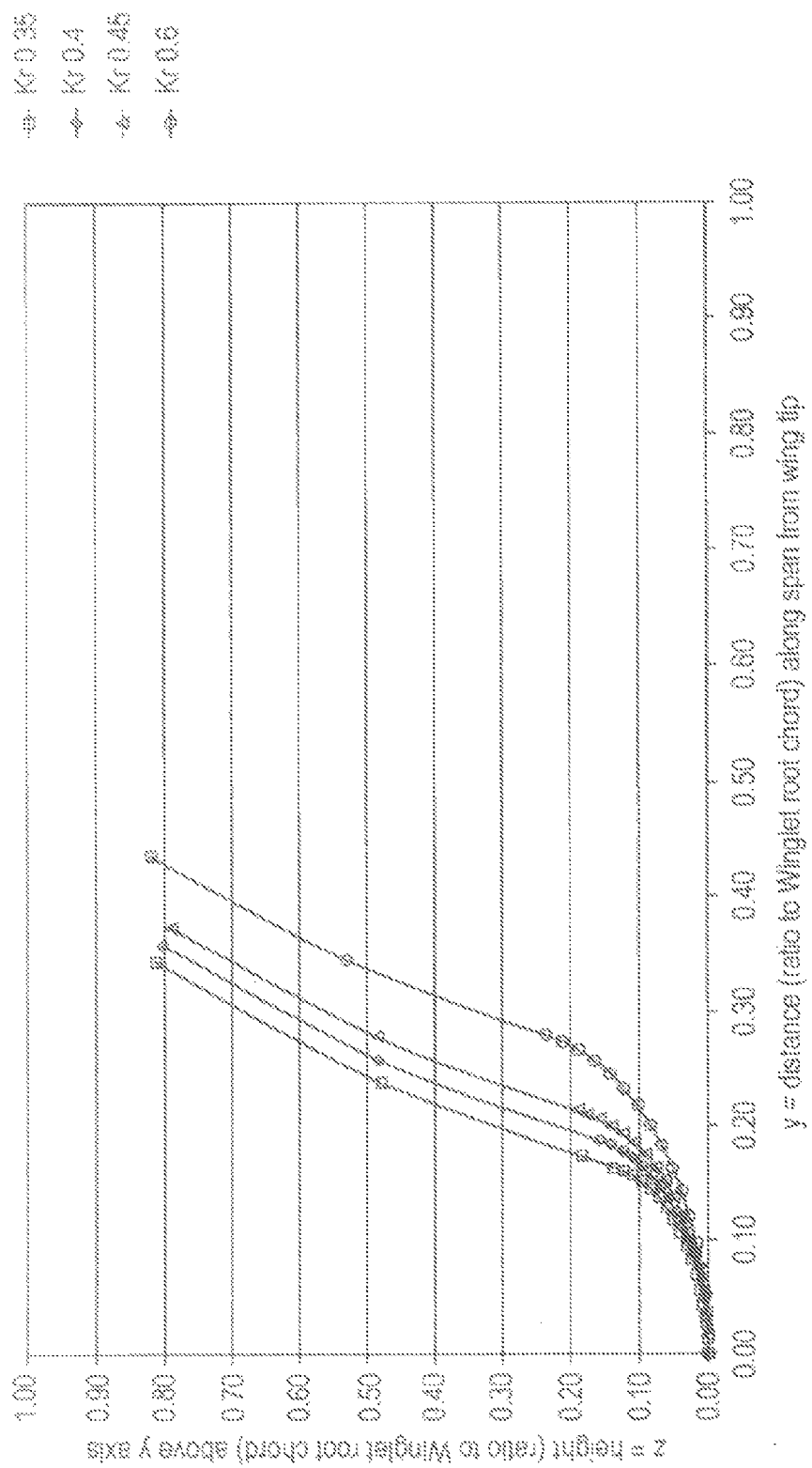
FIG. 15 is a front devotional graph comparing the compound curve (two radii) winglet profile having a reflex in curvature for various values of the design parameter Kr.
Figure 16:
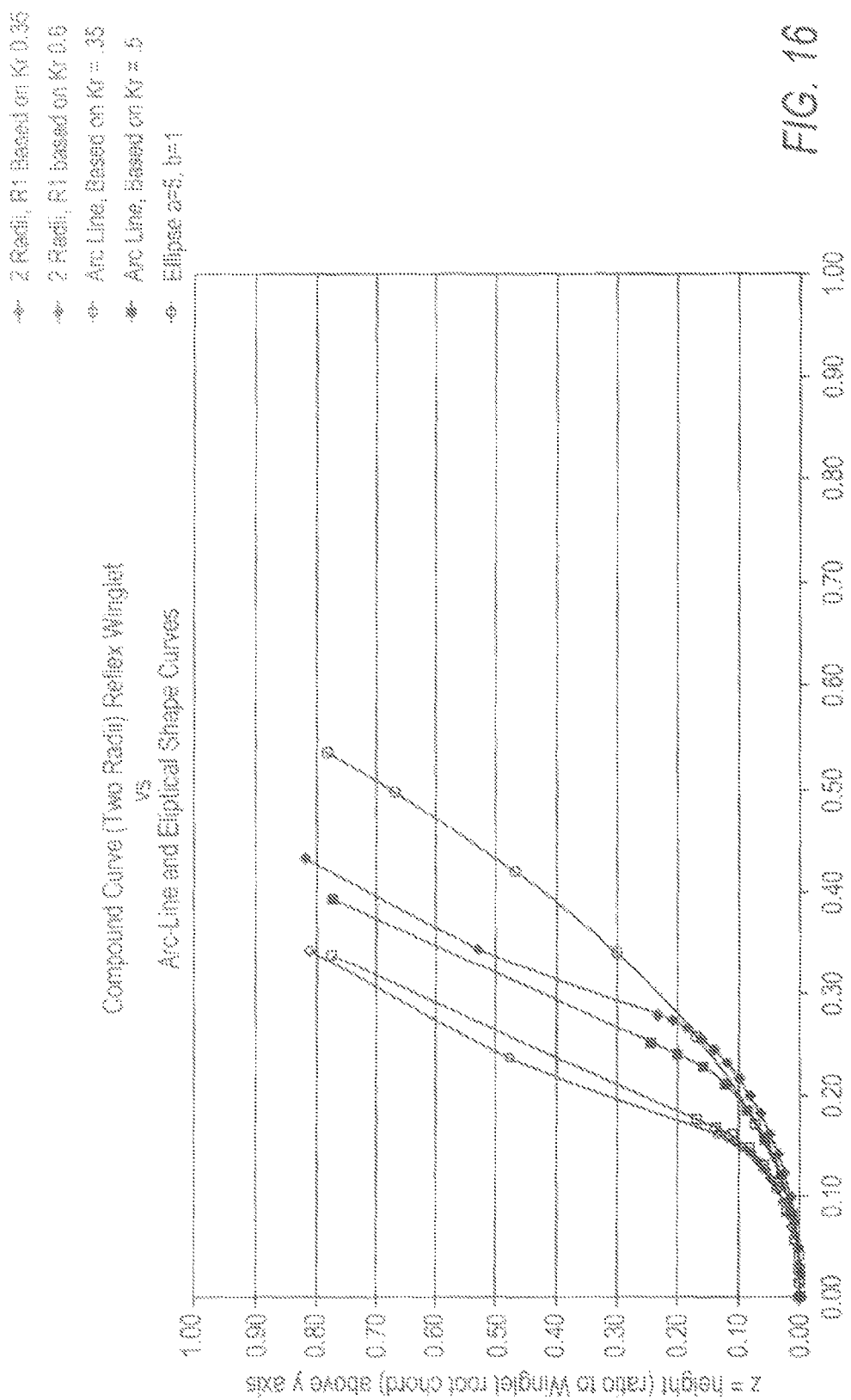
FIG. 16 is a front elevational graph comparing the compound curve (two radii) winglet profile having a reflex in curvature of the present invention with the arc-line (U.S. Pat. No. 5,343,253) and the elliptical (U.S. Pat. No. 6,484,968 B2) winglet profiles.

FIGS. 14-46 presents a variation of the invention wherein the compound curve profile contains a reflex in curvature. Referring to FIG. 14, the reference curve generated (403) from the winglet trailing edge profile (405) projection onto a plane normal to the winglet inner or root chord line (342) follows a curve approximating a curve composed of two arc segments wherein the first arc segment (306) has its center on an axis (308) that is substantially perpendicular to the wing reference plane (331) and substantially intersects the location where the outer or tip end (341) of the wing (300) is joined to the inner or root end (342) of the winglet (302). The first arc segment (306) has radius R1 and begins at the wing tip (304) and extends though an angle (350) relative to axis (308) about point (347). The second arc segment (407) has radius R3 with center (448) located outboard of the winglet tip, where R3>R1, and begins at the upper end (300) of the first arc segment (306), where it is also tangent to the first arc segment (306), and extends until a line (409) tangent to the second arc segment (407) forms cant angle (451) a relative to axis 308a that is parallel with axis 308 and normal to the wing reference plane (331).

For the two arc compound curve profile (405) with a reflex curvature described above (center of R3 located outboard of the winglet tip) it is also necessary to determine the arc radius (R3) for the second arc segment. R3 can be determined from the following equation:

$R3=(h-R1*(1-\cos[\beta]))/(\sin[\phi]-\cos[\beta])$

R3=Reflex Compound curve second (upper) section arc radius, R3>R1

R1=Compound curve first (lower) section arc radius beta=arc segment angle (in degrees) for first curve segment h=winglet height (normal to wing ref plane)

phi=cant angle (deg) of second arc section at winglet tip, 10>phi<35 pi=3.14159

For this two arc compound curve profile (405) with a reflex angle, it is also necessary to specify the end points of both arc segments. For the first arc segment (306), the inboard end point (306a) is coincident with wing tip end plane at (304) and tangent to the wing reference plane (331). The upper, outer end point (306b) of the first arc segment (306) is defined by specifying angle beta (305) about the first arc segment center (347). Depending upon the desired winglet height (410), this angle beta (450) is generally greater than 50 degrees and less than 90 degrees, with 75 to 85 degrees being generally the preferred value.

As mentioned previously the arc length of the first arc segment (306) must be long enough to provide sufficient distance in the y' direction to keep the transition section maximum sweep angle (372) from exceeding the 65 degree limit. For the second arc segment (407), the inboard end point is coincident with and tangent to the upper, outboard end (306b) of the first arc segment. The upper, outboard end (407a) of the second arc segment (407) is determined from the desired winglet tip cant angle phi (451). Depending upon the angle (450) selected for beta, and the desired winglet height (410), the winglet tip cant angle phi (451) is generally greater than 10 degrees and less than 35 degrees, with 17 to 23 degrees being generally the preferred value. Equations for the y-z coordinates of the arc end points relative to the wing tip are as follows:

theta=outboard direction angle about radius (R1) center relative to the wing tip y-z plane, deg beta=value of theta at start of 2nd segment, deg if theta>=0, and <=beta, use following equations:

$R1$ arc center at $y=0, z=R1$

Distance along Wing Span from Wing Tip, $y=R1*\sin(\text{theta})$

Distance above Wing Reference Plane, $z=R1*(1-\cos(\text{theta}))$ if theta>beta, use following equations:

$R3$ arc center at $y=(R3+R1)*\sin(\text{beta})$, $z=R1-(R3+R1)*\cos(\text{beta})$ Distance along Wing Span from Wing Tip, $y=R3*\sin(90-\text{theta}+2*\text{beta})+(R3+R1)*\sin(\text{beta})$ Distance above Wing Reference Plane, $z=R3*(\sin(90-\text{theta}+2*\text{beta}))+R1-(R3+R1)*\cos(\text{beta})$ Also;

Distance along Wing Span ($y$) to start of Winglet 2nd Arc Section $y3=R1*\sin(\text{beta})$ Height ($z$) from wing reference plane to start of Winglet 2nd arc Section $z3=R1*(1-\cos(\text{beta}))$ Distance along Wing Span (y) to outboard end of Winglet 2nd Arc Section $y4=R3*\cos(180-\text{phi})+(R3+R1)*\sin(\text{beta})$ Height ($z$) from wing reference plane to outboard end of Winglet 2nd Arc Section $z4=h$, Height of Winglet$=R3*\sin(180-\text{phi})+R1(R3+R1)*\cos(\text{beta})$ Depending on the values selected for angles beta (450) and phi (451), as well as other design parameters, it should be noted that the winglet geometry for the curve profile (403) with reflex in curvature can result in the net lift of the sail section having a greater vertical component than the net lift of the sail section for winglet geometry derived from a curve profile without reflex in curvature. This increase in sail section vertical lift contributed by the winglet profile with reflex in curvature will reduce the net lift required by the wing (300) and, thereby reduce the wing lift induced drag.

The shape of the winglet compound curve (403) profile with reflex in curvature can be modified by replacing one or both of the arc segments (306, 407) with a rho conic curve (or other curve such as a b-spline) as previously described for the winglet compound curve (303) profile without reflex in curvature.

Another aspect of the improved winglet design provided herein relates to the shape of the airfoil sections used to define the winglet aerodynamic upper and lower surfaces between the winglet root (at y'=y0') and the start of the winglet sail section (at y'=y3'). FIGS. 13A, 13B, and 13C show an example airfoil (6) located in the winglet transition region (y0'<y'<y3'). Airfoil sections are provided in a variety of aerodynamic text (e.g. Theory of Wings, Abbott and Von Doenhoff, Dover Publications) as well as NACA and NASA reports (e.g. A Design Approach an Selected Wind-Tunnel Results at High Subsonic Speeds for Wing-Tip Mounted Winglets", Richard Whitcomb, NASA TN D-8260). There are also other airfoil sections developed by private companies such as the AM1 airfoil developed by Analytical Methods, Incorporated in Seattle Wash.

The airfoil shapes are generally defined by a series of (x, z) points where the x coordinate represent the ratio to chord distance along the chord line from the airfoil's leading edge point, and the z coordinate represent the normal offset distance (or radial distance to profile curve tangent point using alternate methods) from the chord line as a ratio the chord length where generally positive z' chord ratio values define the upper surface, and generally negative z' chord ratio values define the lower surface values (lower surface coordinates for highly cambered airfoils may be above the chord line, thus have positive z coordinates over a portion of the chord distance). A leading edge radius (as a ratio of the chord length) and the slope of the line through the leading edge radius center and leading edge point is also provided to better define the airfoil curvature near the leading edge. Trailing edge radius (as a ratio of the chord length) values may also be provided to define the trailing edge thickness.

The airfoil section at the winglet's root section must conform to the shape of the wing where it is being attached, thus the winglet's root airfoil section is defined as being the same as that of the wing tip section. For example, the Aerostar wing uses the NACA 64A-212 series airfoil, thus the winglet design for the Aerostat would have its root airfoil section also defined by the NACA 64A-212 coordinates. The airfoil series used for the winglet sail section (y'=y3' to y'=y4') is generally, but not always constant; however, is likely to be different than that of the wing. For example, the winglet sail section airfoil selected by Whitcomb in NASA report TN D8260 was the Modified GA(W-2) airfoil having significantly more camber that most wing airfoil sections. Given the airfoil shape at the winglet root (y'=y0') is likely to be different that the airfoil at the base of the winglet sail (y'=y3') the airfoil shapes used between these two locations (transition section) need to be established. In the invention provided herein, these transition region airfoils are defined as a proportional blend of the winglet root (y'=y0') airfoil z' direction chord ratio coordinates and winglet sail base (y'=y3') airfoil z' direction chord ratio coordinates. Referring to the winglet developed layout, a proportionality factor, F, is defined as follows:

$F=0$, for $<y10'$ $F=(d/L)^a$, for $y10'<z=y'y03'$ $F=1$, for $y'>y03'$

Where:
L=y' axis distance from the winglet airfoil blend starting point (y'=y01'), generally the winglet inner or root chord location (y01'=y0'), to the winglet airfoil blend ending point (y'=y03'), generally, the at winglet sail base chord location (y03'==y3'), in the developed layout coordinate system.

d=y' axis distance from the winglet airfoil blend starting point to the winglet transition section chord location (y') in the developed layout coordinate system.

a=proportionality exponent, 0.5<a<1.5, a=1.0 preferred

The airfoil section z' chord ratio coordinated for each x' ratio chord location coordinate for any location (y') between the airfoil blend starting point (y'=y01') and winglet sail base section (y'=y03') is as follows:

z' at (y')=z' at (y'=01')+F*{(z at y'=y03')-(z' at y'=01')} where:
- z' at (y')=the airfoil normal offset chord ratio coordinate at the specified x chord ratio for location y in the developed layout coordinate system.
- (z' at y' y01')=the airfoil normal offset chord ratio coordinate at the specified x' chord ratio for location y01' in the developed layout coordinate system.
- (z' at y'=y03')=the airfoil normal offset chord ratio coordinate at the specified x' chord ratio for location y03' in the developed layout coordinate system.

Figure 17:
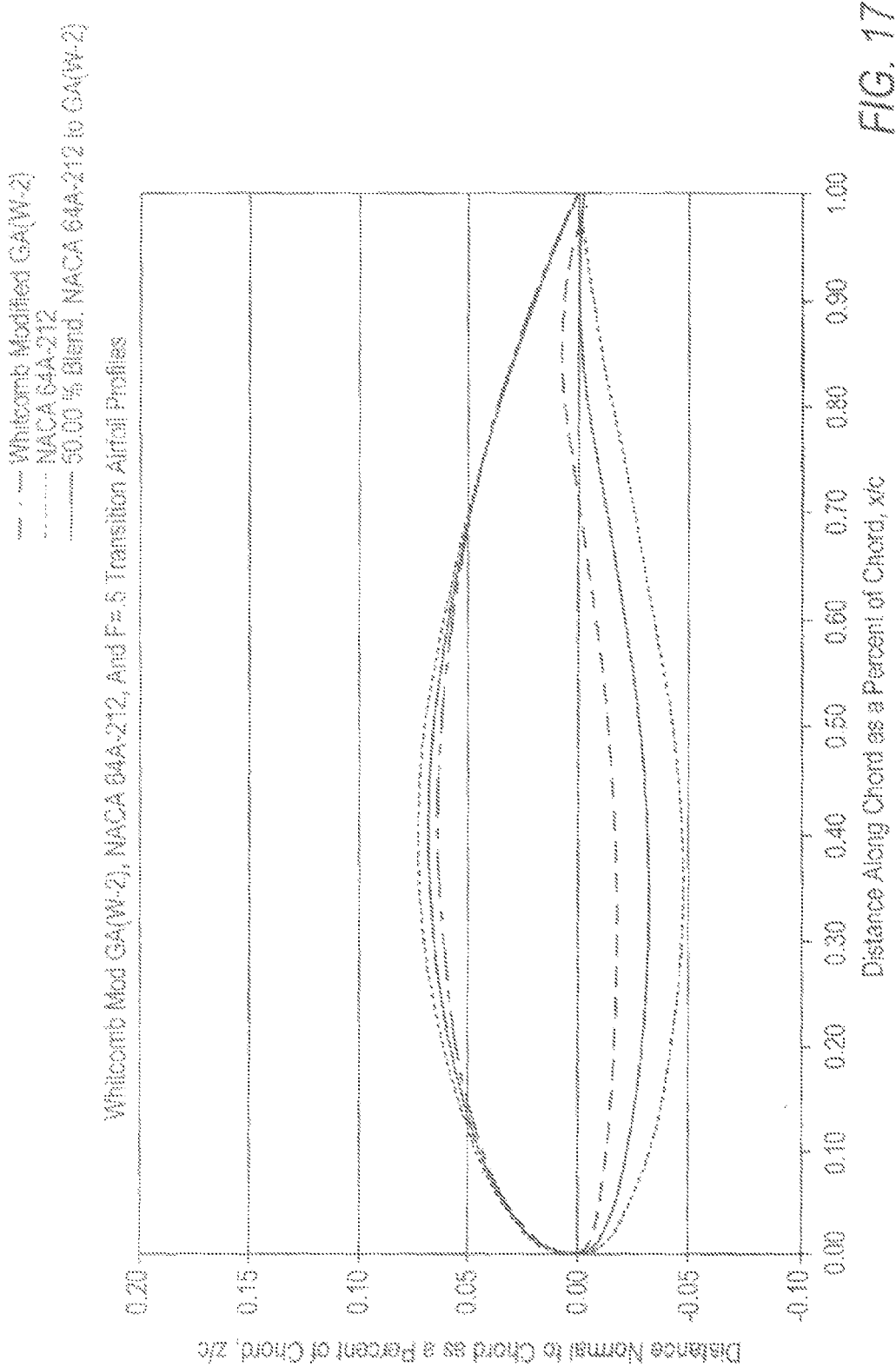
FIG. 17 is a graph of a winglet transition section proportional blend airfoil in comparison to the reference winglet root section airfoil, NACA 64A-212, and the reference sail section airfoil, GA(W-2), for an example winglet for the Aerostat model 600/700 series aircraft.

As is the customary procedure, the actual airfoil (x', z') coordinates for a particular section y' coordinate location are obtained by multiplying the chord ratio coordinate values determined above by the airfoil chord length at that location. A graphical comparison of the transition section airfoil shape for F=0.5 for an example winglet design aircraft is shown in FIG. 17. This graph is only an example and is not intended to limit the application to any specific airfoil geometry. Also, localized modifications to any specific airfoil sections such as the transition section nose camber modifications described in U.S. Pat. No. 5,348,253 may also be incorporated.

The reduction in induced drag provided by winglets is greater for wings having a high wing loading, (aircraft weight divided by wing area). This is because a higher loaded wing generates a stronger vortex at the wing tip. Commercial aircraft typically have substantially less wing area per pound than General Aviation aircraft. Commercial aircraft also utilize complicated, and expensive devices such as leading edge slates, and multi-segment flaps to reduce stall speeds and improve low speed handling characteristics. Because of the higher wing loading winglets potentially provide more improvement to Commercial aircraft over General Aviation aircraft. None-the-less, a good winglet design, such as describe herein, can significantly improve the performance of General Aviation aircraft, particularly during climb conditions.

Figure 18:
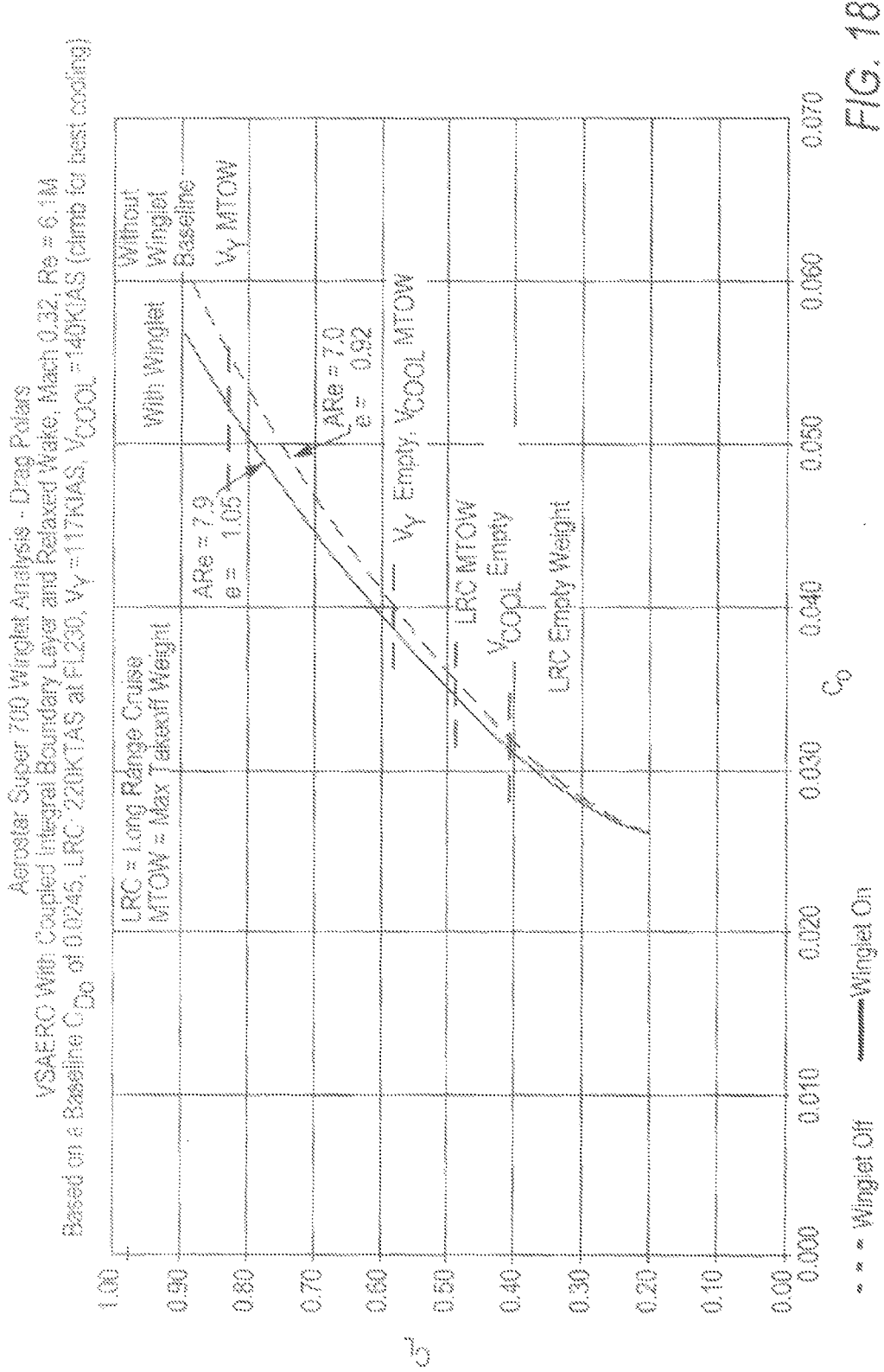
FIG. 18 is a graph plotting the lift coefficient versus drag coefficient for the stock Aerostar Super 700 model series aircraft without winglet and with the composite curve winglet of this invention.
Figure 19:
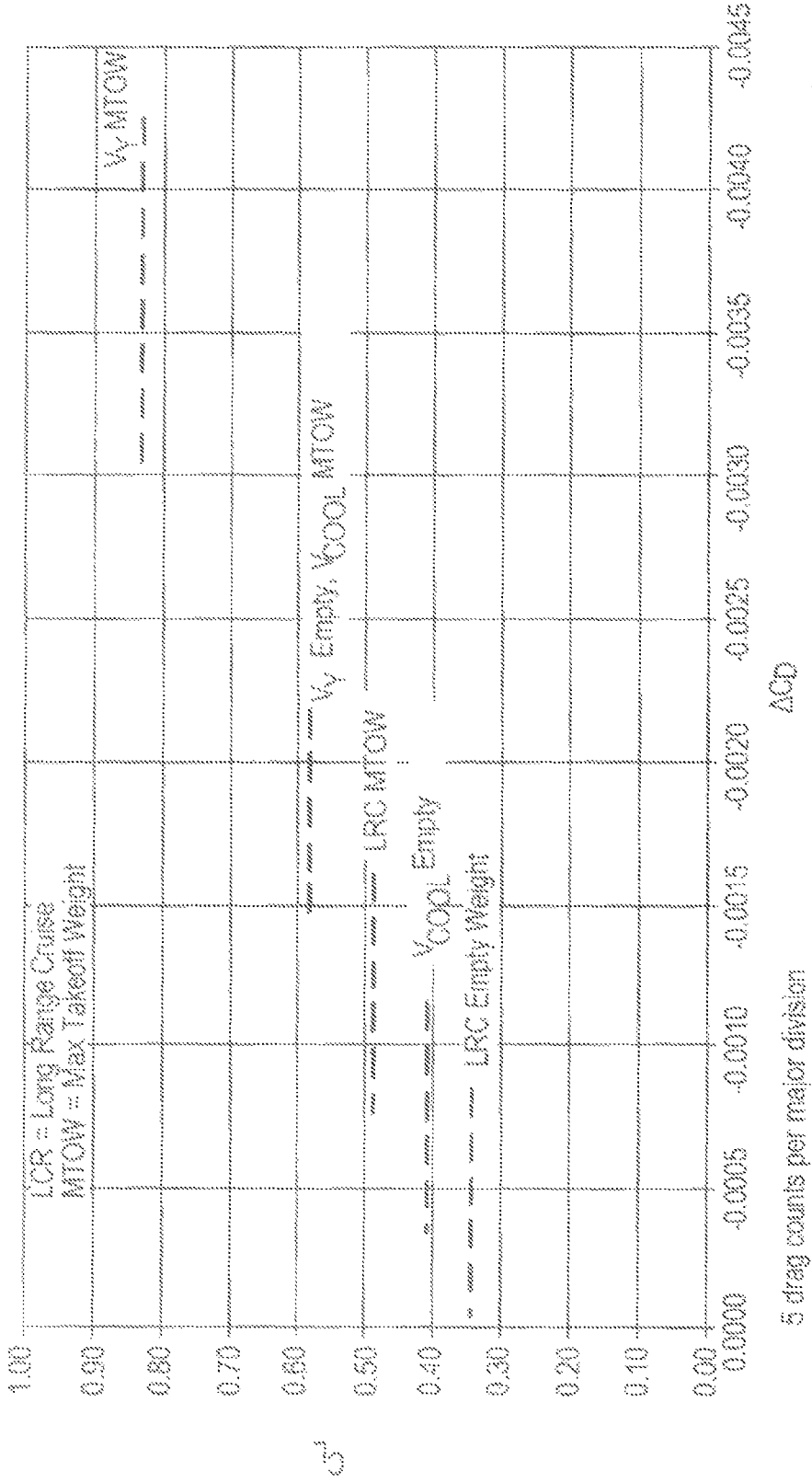
FIG. 19 is a graph plotting lift coefficient versus drag reduction increment for the Aerostar Super 700 model series aircraft with the composite curve winglet of this invention in comparison to the stock aircraft without winglet.

As an example, an evaluation of the Aerostar model 600/700 series aircraft, a typical high performance general aviation piston twin engine aircraft, was performed using the "VSAero" CFI) computer program. FIG. 18 is a graph plotting lift coefficient versus drag coefficient for the stock Aerostar model 600/700 series aircraft, without winglets, and with the composite curve winglets of this invention. FIG. 19 is a graph plotting lift coefficient versus drag reduction increment for the Aerostar Super 700 model aircraft with the composite curve winglet of this invention in comparison to the stock aircraft without winglet. Also shown in these graphs are lines of constant lift coefficient (CL) representing typical flight conditions. These typical flight conditions include Long Rang Cruise (LRC) at Empty Weight and Maximum Takeoff Weight (MTOW), climb at maximum performance climb speed (Vy) at Empty Weight and MTOW conditions, and cruise clime at best engine cooling speed (Vcool) also at Empty and MTOW conditions.

Figure 20:
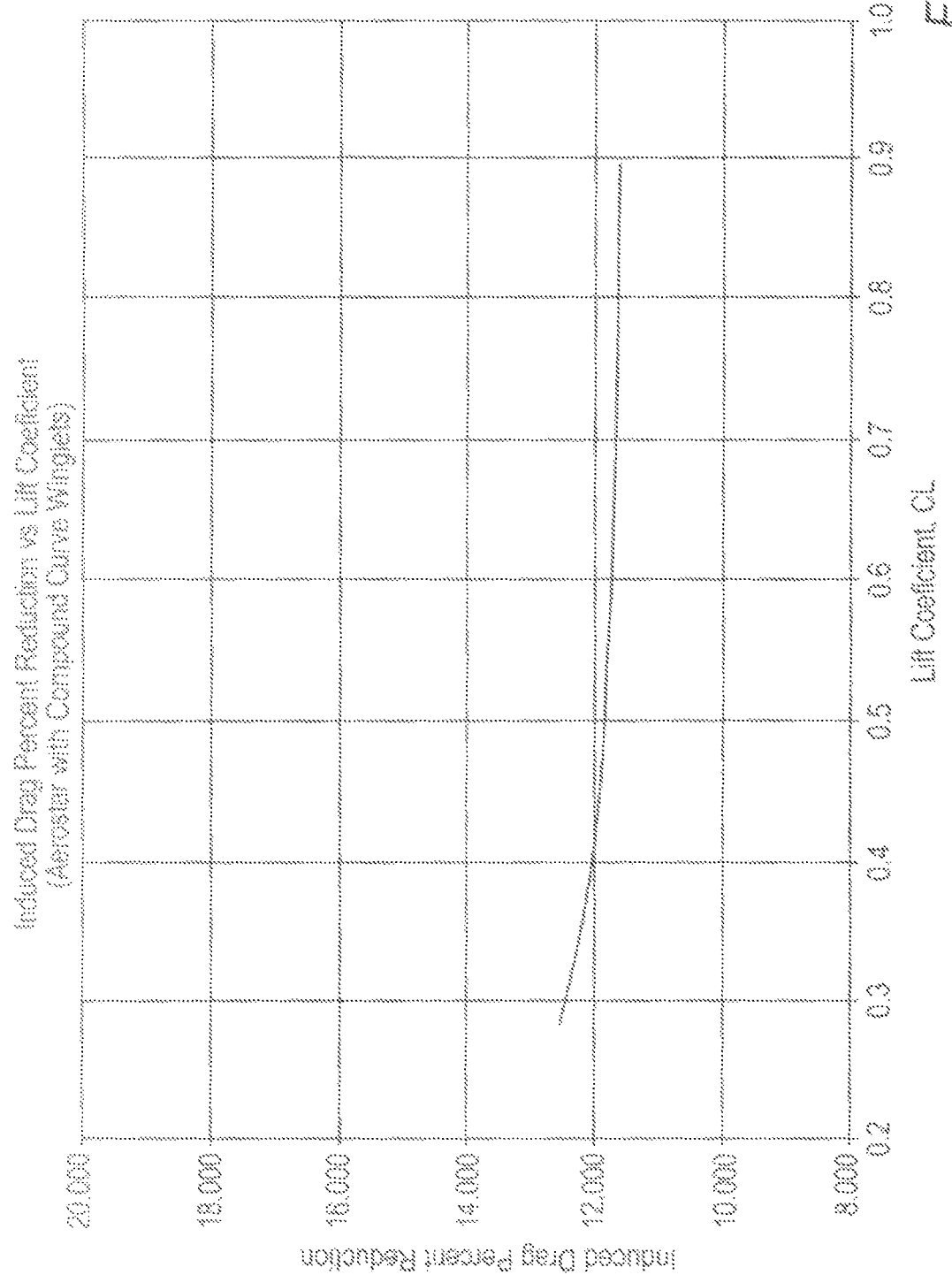
FIG. 20 is a graph plotting the induced drag reduction versus lift coefficient for the Aerostar Super 700 model series aircraft with the composite curve winglet of this invention in comparison to the stock aircraft without winglet.

These graphs shows that the composite curve winglet of the present invention reduces drag of the Aerostar Super 700 model aircraft by approximately eight percent (8%) for maximum takeoff weight (MTOW) climb (Vy) conditions. FIG. 20 shows the induced drag percent reduction versus lift coefficient and shows the induced drag portion or drag due to lift is reduced by about 12 percent. This drag reduction illustrates the value of the composite curve winglet described in this invention. The continuously curving profile of the composite curve contour winglets improves aircraft performance, particularly during climb, and adds to the aesthetic appearance of the winglet design.

Winglet Design Procedure Example

A compound curve winglet using the unique concepts of this invention is obtained for the existing Aerostar model 600/700 series aircraft. The compound curve profile will be determined for the winglet trailing edge projection on the chord normal plane, is selected as being the shape following the compound curve profile.

It is initially assumed that the wingtip chord, Ctip, equals 1; then h becomes the winglet height to root chord ratio. The following parameters are used to define the two radii (or two segment compound curve winglet contour, as defined above:

$h = h/Ctip$ = winglet height to winglet root chord ratio, for $Ctip = 1$ $phi(\phi)$ = cant angle at Winglet Tip, deg°

$Kr$ = curvature parameter $R1$ = 1st segment radius to winglet chord ratio $R2$ = 2nd segment radius to winglet chord ratio $R2 = (h - R1*(1-\cos(\beta)))/(\cos(\beta) - \sin(\phi))$ For the Aerostar design values of h/Ctip=0.75, the following values were selected: $\beta=65°$, and $\phi=15$ degrees were selected. This selection of these values is based on experience in achieving a winglet size compatible with estimates of the existing wing's structural limitations, as well as the esthetic appearance of the winglet. These values also provide sufficient developed y distance length, to accommodate die desired transition section geometry wherein the transition section sweep angle is between 55 and 65 degrees.

TABLE 1

| h/Ctip | 0.75 |
|---|---|
| phi ($\phi$) | 15 deg |
| beta ($\beta$) | 65 deg |

Using polar coordinates to define the curve where the polar coordinate origin is at the y-z plane origin and the polar coordinate angle (theta) is measured relative to the y axis:
theta ($\theta$) angle about blend radius (R1) center
if $\theta >= 0$, and $\theta <=$ beta, use the following equations:

$R1$ arc center at $y=0, z=R1$ $R1/h = Kr*\cos(\phi/2 + pi/4)/\cos(\phi)$

TABLE 2

| Kr | 0.4 | 0.5 | 0.6 | 0.7 |
|---|---|---|---|---|
| R1/Ctip | 0.18907 | 0.23634 | 0.28361 | 0.33087 |

Distance along Winglet Span from Wing Tip,
$y = R1*\sin(\theta)$

Distance above WRP as a ratio to Ctip, $z = R1*(1-\cos(\theta))$

Let $\beta$=angle (deg) about center of 1st segment arc (ref. z axis at wing tip) to start of 2nd segment arc.
if $\theta > \beta$, use the following equations:

$R2$ arc center at $y=(R2-R1)*\sin(\beta), z=(R2-R1)*\cos(\beta)+R1$ $R2/Ctip = (h - R1*(1-\cos(\beta)))/(\cos(\beta) - \sin(\phi))$

TABLE 3

| Kr | 0.4 | 0.5 | 0.6 | 0.7 |
|---|---|---|---|---|
| R2/Ctip | 3.91231 | 3.74570 | 3.57908 | 3.41247 |

$\theta$ now is the angle about the $2^{nd}$ blend radius (R2) center and:

$$y = R2 * \sin(\theta) - (R2 - R1) * \sin(\beta)$$

$$z = R2 * (1 - \cos(\theta)) - (R2 - R1) * \cos(\beta)$$

$y'$ = Span Distance (y) to start of winglet 2nd radius section = $R1 * \sin(\beta)$ $z'$ = Height (z) to start of winglet 2nd radius section = $R1 * (1 - \cos(\beta))$ Span Distance (y) to end of winglet 2nd radius section $$y'' = R2 * \sin(90 - \phi) - (R2 - R1) * \sin(\beta)$$

$z''$ = Height (z) to end of winglet 2nd radius section $$z'' = h = R2 * (1 - \cos(90 - \phi)) - (R2 - R1) * (1 - \cos(\beta))$$

TABLE 4

| Kr | | | | | | | |
|---|---|---|---|---|---|---|---|
| 0.4 | | 0.5 | | 0.6 | | 0.7 | |
| y' | z' | y' | z' | y' | z' | y' | z' |
| 0.171356395 | 0.10916606 | 0.214195 | 0.136458 | 0.257035 | 0.163749 | 0.299874 | 0.191041 |
| y'' | z'' | y'' | z'' | y'' | z'' | y'' | z'' |
| 0.404600873 | 0.75 | 0.437507 | 0.75 | 0.470412 | 0.75 | 0.503318 | 0.75 |

Note the angle theta is equivalent to the winglet dihedral angle relative to the wing reference plane (WRP) at the calculated span locations.

Using the above equations, the (y, z) coordinates for the two radii (or two segment) compound curve winglet contour expressed as percentage of the winglet root chord length (since Ctip=Cw root was assumed=1) for the selected values of curvature parameter Kr are:

TABLE 5

| | Kr = | | | | | | | |
|---|---|---|---|---|---|---|---|---|
| | 0.4 | | 0.5 | | 0.6 | | 0.7 | |
| theta | y | z | y | z | y | z | y | z |
| 0 | 0.00000 | 0.00000 | 0.00000 | 0.00000 | 0.00000 | 0.00000 | 0.00000 | 0.00000 |
| 5 | 0.01648 | 0.00072 | 0.02060 | 0.00090 | 0.02472 | 0.00108 | 0.02884 | 0.00126 |
| 10 | 0.03283 | 0.00287 | 0.04104 | 0.00359 | 0.04925 | 0.00431 | 0.05746 | 0.00503 |
| 15 | 0.04894 | 0.00644 | 0.06117 | 0.00805 | 0.07340 | 0.00966 | 0.08564 | 0.01127 |
| 20 | 0.06467 | 0.01140 | 0.08083 | 0.01425 | 0.09700 | 0.01710 | 0.11317 | 0.01995 |
| 25 | 0.07990 | 0.01771 | 0.09988 | 0.02214 | 0.11986 | 0.02657 | 0.13983 | 0.03100 |
| 30 | 0.09454 | 0.02533 | 0.11817 | 0.03166 | 0.14180 | 0.03800 | 0.16544 | 0.04433 |
| 35 | 0.10845 | 0.03419 | 0.13556 | 0.04274 | 0.16267 | 0.05129 | 0.18978 | 0.05984 |
| 40 | 0.12153 | 0.04423 | 0.15192 | 0.05529 | 0.18230 | 0.06635 | 0.21268 | 0.07741 |
| 46 | 0.13369 | 0.05538 | 0.16712 | 0.06922 | 0.20054 | 0.08307 | 0.23396 | 0.09691 |
| 50 | 0.14484 | 0.06754 | 0.18105 | 0.08442 | 0.21726 | 0.10131 | 0.25346 | 0.11819 |
| 55 | 0.15488 | 0.08062 | 0.19360 | 0.10078 | 0.23232 | 0.12094 | 0.27104 | 0.14109 |
| 60 | 0.16374 | 0.09454 | 0.20468 | 0.11817 | 0.24561 | 0.14180 | 0.28655 | 0.16544 |
| 65 | 0.17136 | 0.10917 | 0.21420 | 0.13646 | 0.25703 | 0.16375 | 0.29987 | 0.19104 |
| 70 | 0.30197 | 0.42449 | 0.33925 | 0.43835 | 0.37652 | 0.45222 | 0.41380 | 0.46608 |
| 75 | 0.40460 | 0.75000 | 0.43751 | 0.75000 | 0.47041 | 0.75000 | 0.50332 | 0.75000 |

The Aerostar's existing wing tip design chord length at the attachment of the winglet has a value of 32.70 inches. Since this is also the winglet root chord length, the (y, z) coordinates for the two radii (or two segment) compound curve winglet contour are obtained by recomputing the values based on Kr=0.65, then multiplying these values by the winglet root chord, Cw_root=32.70. The results are as follows:

TABLE 6

| Cw root 32.7 inches | | | | |
|---|---|---|---|---|
| R1 10.047 inches | | | | |
| R2 114.312 inches | | | | |
| Kr | 0.65 | | | |
| theta | y = Y/Cw_root | z = Z/Cw_root | Y inches | Z inches |
| 0 | 0.00000 | 0.00000 | 0.000 | 0.000 |
| 5 | 0.02678 | 0.00117 | 0.876 | 0.038 |
| 10 | 0.05335 | 0.00467 | 1.745 | 0.153 |
| 15 | 0.07952 | 0.01047 | 2.600 | 0.342 |
| 20 | 0.10508 | 0.01853 | 3.436 | 0.606 |
| 25 | 0.12985 | 0.02879 | 4.246 | 0.941 |
| 30 | 0.15362 | 0.04116 | 5.023 | 1.346 |
| 35 | 0.17623 | 0.05556 | 5.763 | 1.817 |
| 40 | 0.19749 | 0.07188 | 6.458 | 2.350 |
| 45 | 0.21725 | 0.08999 | 7.104 | 2.943 |

TABLE 6-continued

Cw root 32.7 inches
R1 10.047 inches
R2 114.312 inches

| Kr theta | 0.65 y = Y/Cw_root | z = Z/Cw_root | Y inches | Z inches |
|---|---|---|---|---|
| 50 | 0.23536 | 0.10975 | 7.696 | 3.589 |
| 55 | 0.25168 | 0.13101 | 8.230 | 4.284 |
| 60 | 0.26608 | 0.15362 | 8.701 | 5.023 |
| 65 | 0.27845 | 0.17739 | 9.105 | 5.801 |
| 70 | 0.39516 | 0.45915 | 12.922 | 15.014 |
| 75 | 0.48687 | 0.75000 | 15.920 | 24.525 |

Figure 25:
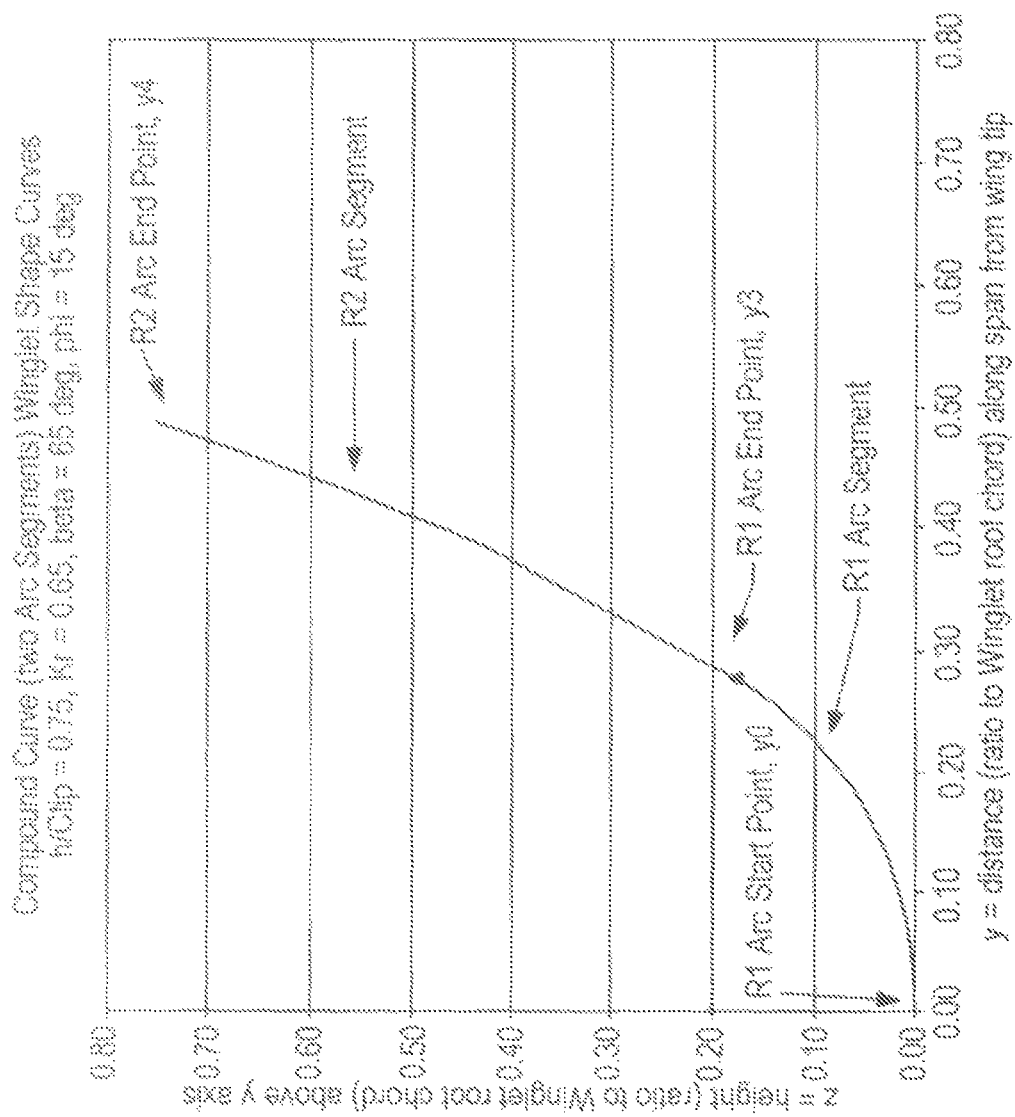
FIG. 25 shows the compound curve for an Aerostar 600/700 Series aircraft comprising two arc curve sections
Figure 26:
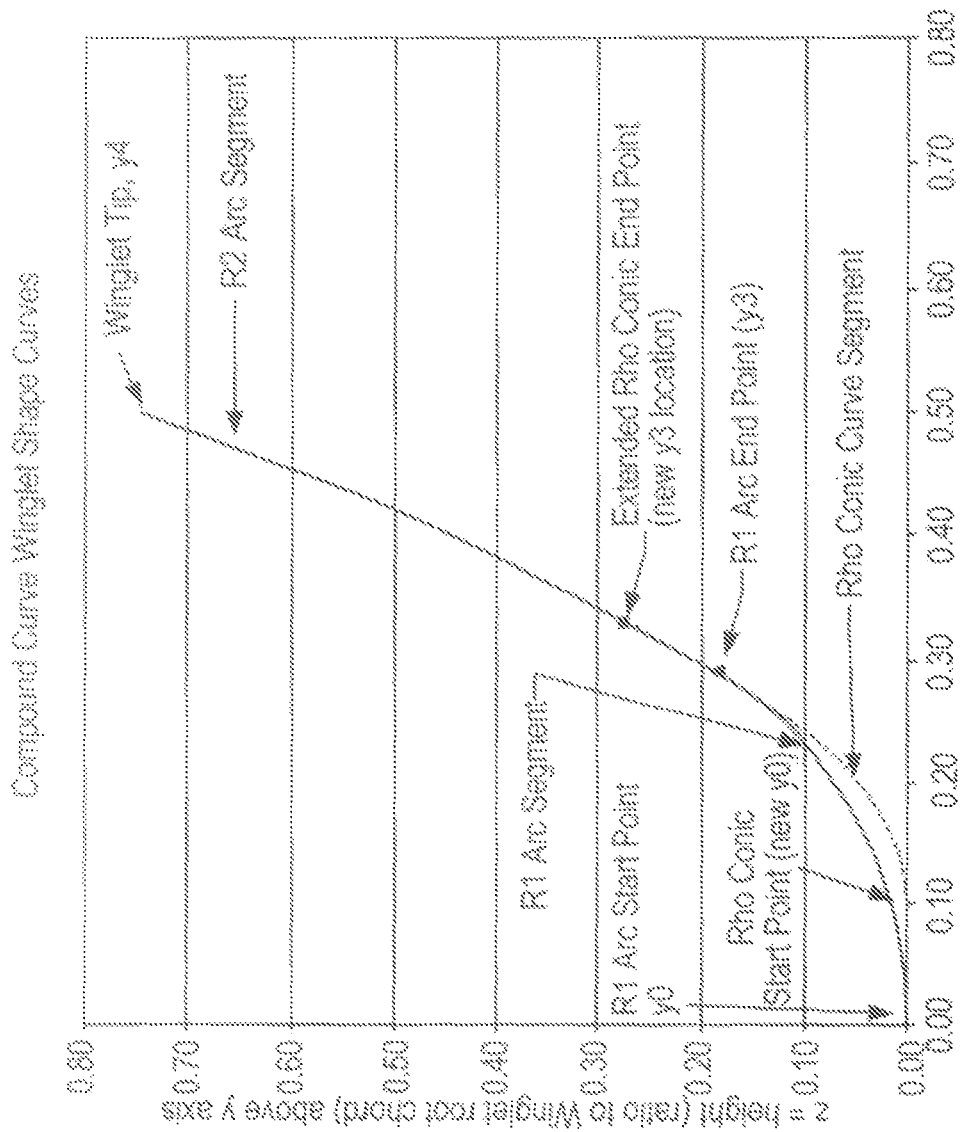
FIG. 26 shows the compound curve for an Aerostar 600/700 Series aircraft comprising a first rho conic curve section and a second arc curve section.

The graph of FIG. 25 illustrates the two arc segment compound curve winglet profile based on a unit length wing tip chord, Ctip=1:

As discussed it sometimes desirable to replace the first arc segment (R1 arc) with a rho conic or B-spline curve to reduce the winglet's half-span length. This is particularly important in applications where wing bending stress margins are low and the increase in bending loads applied by the winglet must be minimized. An example wherein the first arc segment is replaced by a rho conic curve is shown in the graph of FIG. 26.

In the above illustration the winglet half-span distance (y4-y0) is approximately 0.5. For this example, the rho conic curve (or other non-constant radius curve) allows the winglet attachment to the wing to be moved from y=0 to y=0.1 while maintaining end point tangencies, thus providing an approximate 20% reduction to the winglet half-span. If it is desired to maintain the same plan form or developed profile as laid out for the two arc segments design, the rho conic curve length would need to be extended to equal to the arc length of the R1 arc segment. This would position the y'3 coordinate at the same plan form location determined above for the two arc segment design. The location of the base of the sail section (at coordinate y3) in the non-developed form would then move from the end point of the original R1 arc segment to the end point of the extended rho conic. For the Aerostar winglet design, a rho value of 0.5 was selected as the preferred contour for the winglet transition section profile.

The winglet shape is determined by generating the developed or plan form boundary curve segments that will be used to define the outer profile of the winglet as shown in FIG. 12. This procedure will utilize the following aircraft geometric data:

Given the following geometric data based on the Aerostar wing design scaled down to achieve a wing tip chord length equal to one:

1 Ctip=Wing Tip Chord Length 12.965 $b$=Wing Span 23.51 $S$=Wing Area 0.38 $TR$=Wing Taper Ratio 0 lamda$B$=Wing L.E. Sweep Angle, Deg along with the following and selected winglet design parameters:

0.23 $Cw$-tip=Winglet Tip Chord Length 60 lamda$N$=Winglet Transition Section Max Sweep Angle, Deg 34 lamdaW=Winglet Sail Section L.E., Sweep Angle, Deg 0.48 Kw=Winglet Taper Ratio Parameter 0.35 Ks=Winglet Lift Coefficient Parameter 0.15 Kphi=Winglet Lift Coefficient Parameter Again, the values of these design parameters based on estimates of the existing wing's structural limitations for the size of the winglet, as well as the esthetic appearance of the winglet. Once the Winglet design has been completed, aerodynamic loads can be determined using standard computational fluid dynamics (CFD) commercially available software packages (e.g. PLOWMAN, CFDesign, and VSAero). Changes to the initially selected winglet design parameters as well as other factors such as winglet airfoil geometry may then need to be varied to achieve the desired combination of wing loading and drag reduction. It should be noted that the primary objective of the winglet design is to achieve optimum circulation of the winglet vortex wake for a given wing and winglet plan form.

We start by defining the winglet developed plan form leading edge (LE) and trailing edge (TE) curves. As described, the plan form is divided into segments that correspond with the different design regions of the winglet. Referring to FIG. 12, equations for the LE curves for each of these segments are as follows:

Segment 1 ($0<x'<=x1'$)

$$x'=A1*y'+B1*y'^2$$

$$A1=\tan(\text{lamdaB})$$

lamdaB=wing LE Sweep Angle $$dx'/dy'=2*B1*y'+A1$$

at $x'=0$, $dx'/dy'$=slope of wing $LE$=tan(lamdaB)

at $x'=x1'$, $dx'/dy'$=Segment 2 sweep angle slope=tan(lamda$N$)=$B2$ $$B2=2*B1*y1'+A1$$

$$B1=(B2-A1)/(2*y1')$$

Segment 2 ($x1'<x'<=x2'$)

$$x'=A2+B2*y'$$

$B2$=tan(lamda$N$)=Segment 2 sweep angle slope lamda$N$=Segment 2 sweep angle (max 65 deg)

$$dx'/dy'=B2=\tan(\text{lamda}N)$$

at $x'=x1'=A1*y1'+B1*y1'^2=A2+B2*y1'$ $$A2=x1'-B2*y1'$$

substituting into Segments 1 and 2 equations:

$$x2'=A2+B2*y1'=A1*y2'+B1*y1'^2$$

$$B1-A2/y1'+B2-A1$$

Segment 3 ($x2'<x'<=x3'$)

$$x'=A3+B3*y'+C3*y'^2$$

$$dx'/dy'=B3+2*C3*y'$$

at $x'=x2'$, $dx'/dy'=B3+2*C3*y2'$=tan(lamda$N$)=$B2$ $$B3=B2-2*C3*y2'$$

at $x'=x3'$, $dx'/dy'=B3+2*C3*y3'=\tan(\text{lamda}W)=B4$ $B3=B4-2*C3*y3'$ thus: $B2-2*C3y2'=B4-2*C3*y3'$ $C3=(B4-B2)/(2*(y3'-y2'))$ substituting into $x'=A3+B3*y'+C3*y'^2$ $x2'=A3+B3y2'+C3*y2'^2$ $A3=x2'-C3*y2'^2-B3*y2'$ $x3'=A3+B3*y3'+C3*y3'^2$ $x3'-x2'+C3*y2'^2-C3*y3'^2=B3*(y3'-y2')$ $B3=(x3'-x2'+C3*(y2'^2-y3'^2))/(y3'-y2')$ $A3=x2'-C3*y2'^2-B3*y2'$ Segment 4 ($x3'<x'<=x4'$)

$x'=A4+B4*y'$ $B4=\tan(\text{lamda}W)$ lamda$W$=Winglet sail section ($y'3$ to $y'4$) sweep angle $A4=x3'-B4*y3'$ Referring to FIG. 12, we first need to get a value for the y3' coordinate which marks the end of the winglet transition section. If we assume the winglet transition section ends at the and of the arc defined by the $1^{st}$ arc segment R1, then the span distance to y3' in the developed from will be the arc length of the $1^{st}$ arc segment defined by R1 or $y3'=R1*(\text{beta})/57.2958$ Since a value of 65 degrees was selected for beta when defining the winglet compound curve profile, the value for y3' as a ratio to Ctip is:

$y3'=R1*(65)/57.2958=1.1345*R1$

We also need to select the locations for y1', and y2'. These values influence the shape of the winglet transition region leading edge. It is convenient to specify the values for y1', and y2' using percentages (D1, D2) of y3'. The following values have been selected for the Aerostar winglet design:

$D1=25\%$, thus $y1'=(D1/100)*y3'$ $D2=60\%$, thus $y2'=(D2/100)*y3'$ then from the specified winglet developed geometry trailing edge we determine values for coordinates x3' and x4'. From x3', x4' and the selected winglet sail section LE slope tan(lamdaW), we find A4, then by knowing the values of the end points (y2',x2'), (y3',x3'), and end point slopes, tan(lamdaN) and tan(lamdaW), determine x2', then determine values for y1' and B1.

Winglet Sail Section Parameters
Winglet Sail Section L.E. Starts at y3', x3'
Winglet Sail Section L.E. Ends at y4', x4'

$h$=winglet height perpendicular to WRP $b$=Wing Span phi_mean=Winglet Sail Section Mean Cant Angle at Winglet Tip phi_mean=(phi+(90−beta))/2 lamda$W$=Winglet L.E. Sweep Angle

Developed Distance from $Cw\_\text{root}$ to $Cw\_\text{tip}$ $y4'=(h-R*\sin(\text{phi}))/\cos(\text{phi})+R*\text{pi}*(90-\text{phi})/180$ Length of Sail Section=$Lw=y4'-Y3'$ where: R=R2=Winglet Sail Section Contour Radius

TABLE 7

| Kr | 0.65 | 0.4 | 0.5 | 0.6 | 0.7 |
|---|---|---|---|---|---|
| R | 0.30724 | 0.18907 | 0.23634 | 0.28361 | 0.33087 |
| y4' | 0.86626 | 0.84006 | 0.85054 | 0.86102 | 0.87150 |
| Lw | 0.51770 | 0.62556 | 0.58242 | 0.53928 | 0.49613 |

$Cw\_\text{tip}$=Winglet Chord Length at Tip $Cw\_\text{proj}$=Winglet Sail Section Projected Chord Length at WRP $CL$=Wing Design Lift Coefficient $CLw$=Winglet Design Lift Coefficient $Cw\_\text{root}$=Winglet Chord Length at Start of Sail Section, $y3'',x3'$ Winglet T.E. Angle=gamma$W=a\tan((Lw*\tan(\text{lamda}W)-(Cw\_\text{root}-Cw\_\text{tip})/Lw)$ gamma$W=a\tan(B4-(Cw\_\text{root}-Cw\_\text{tip}))/Lw)$ $Dw=h/\cos(\text{phi})$=Distance from Winglet Projected Root to Tip $Dw=0.82014$ $Cw\_\text{proj}=Cw\_\text{tip}/TRw$ $Cw\_\text{root}=(Lw/Dw)*(Cw\_\text{tip}/TRw)$ Winglet Taper Ratio=$TRw=Kw(2h/b)^{0.2}$ where: $0.45<Kw<0.55$

TABLE 8

| | | | Kw | | | |
|---|---|---|---|---|---|---|
| | | Kw | 0.48 | 0.45 | 0.5 | 0.55 |
| | TRw | | 0.31182 | 0.29233 | 0.32481 | 0.35729 |
| Virtual Root Chord = | Cw_proj | | 0.73760 | 0.78678 | 0.70810 | 0.64373 |
| Kr = | 0.65Cw_root | | 0.47844 | | | |
| | gammaW | | 11.01304 | | | |

TABLE 8-continued

| | | Kw | | | |
|---|---|---|---|---|---|
| | Kw | 0.48 | 0.45 | 0.5 | 0.55 |
| Kr = | 0.4Cw_root | | 0.61666 | 0.55499 | 0.50454 |
| | gammaW | | 3.22844 | 8.80983 | 13.25918 |
| Kr = | 0.5Cw_root | | 0.57413 | 0.51672 | 0.46974 |
| | gammaW | | 4.78120 | 10.32708 | 14.72830 |
| Kr = | 0.6Cw_root | | 0.53160 | 0.47844 | 0.43495 |
| | gammaW | | 6.57347 | 12.06880 | 16.40790 |
| Kr = | 0.7Cw_root | | 0.48907 | 0.44017 | 0.40015 |
| | gammaW | | 8.66085 | 14.08473 | 18.34311 |

Winglet T.E. Lines
y' vs x"
Segments 1 to 3
y'=0 to y3'

$TR$=Wing Taper Ratio=(Wing Tip Chord)/(Wing Root Chord)

Wing T.E. Angle=gamma$B$ $\tan(\text{gamma}B)=((b/2)*\tan(\text{lamda}B)-(C\text{root}-C\text{tip}))/(b/2)$ $\tan(\text{gamma}B)=\tan(\text{lamda}B)-2*C\text{tip}*(1/TR-1)/b$ gamma$B$=$a\tan(A1-2*C\text{tip}*(1/TR-1)/b)$ gamma$B$=Wing T.E, Angle=14.127 deg.

at $y'=0, x''$=Wing Tip Chord=$C\text{tip}$ from y'=0 to y'=y3'

$x''=C\text{tip}+y'*\tan(\text{gamma})$ $x3''=C\text{tip}+y3'*\tan(\text{gamma})+\text{additional offset}$ where the additional offset is selected at 6% of Clip (+ for aft offset direction)

TABLE 9

| Kr | 0.65 | 0.4 | 0.5 | 0.6 | 0.7 |
|---|---|---|---|---|---|
| x3" | 0.97227 | 1.00601 | 0.99252 | 0.97902 | 0.96552 |

Segment 4
y'=y'3 to y'4

$x''=x3''+(y'-y3')*\tan(\text{gamma}W)$ $x''=C\text{tip}+y3'*\tan(\text{gamma}B)+(y4'-y3')*\tan(\text{gamma}W)$ at $y'=y4', x4''=C\text{tip}+y3'*\tan(\text{gamma}B)+(y4'-y3')*\tan(\text{gamma}W)$ $x4''=x3''+lw*\tan(\text{gamma}W)$

TABLE 10

| Kw | Kr | 0.65 | 0.4 | 0.5 | 0.6 | 0.7 |
|---|---|---|---|---|---|---|
| 0.48 | x4" | 1.07303 | | | | |
| 0.45 | x4" | | 1.04130 | 1.04123 | 1.04116 | 1.08243 |
| 0.5 | x4" | | 1.10297 | 1.09865 | 1.09432 | 1.09000 |
| 0.55 | x4" | | 1.15342 | 1.14562 | 1.13782 | 1.13002 |

Winglet Sail Section L.E. Line
Segment 4
from y'=y3' to y4'

$x4'=x4''-Cw\_tip$ $x'=x4'-(y4'-y')*\tan(\text{lamda}W)$ $x'=x4'-(y4'-y')*B4$

TABLE 11

| Kw | Kr | 0.65 | 0.4 | 0.5 | 0.6 | 0.7 |
|---|---|---|---|---|---|---|
| 0.48 | x4' | 0.84303 | | | | |
| 0.45 | x4' | | 0.81130 | 0.81123 | 0.81116 | 0.85243 |
| 0.5 | x4' | | 0.87297 | 0.86865 | 0.86432 | 0.86000 |
| 0.55 | x4' | | 0.92342 | 0.91562 | 0.90782 | 0.90002 | for y'=y3'

$x3'=x4'-(y4'-y3')*\tan(\text{lamda}W)=x4'-Lw*B4$

TABLE 12

| Kw | Kr | 0.65 | 0.4 | 0.5 | 0.6 | 0.7 |
|---|---|---|---|---|---|---|
| 0.48 | x3' | 0.49383 | | | | |
| 0.45 | x3' | | 0.38935 | 0.41839 | 0.44742 | 0.51779 |
| 0.5 | x3' | | 0.45102 | 0.47580 | 0.50058 | 0.52536 |
| 0.55 | x3' | | 0.50147 | 0.52277 | 0.54407 | 0.56537 |

Alternatively, $x3'=x3''-Cw\_root$

TABLE 13

| Kw | Kr | 0.65 | 0.4 | 0.5 | 0.6 | 0.7 |
|---|---|---|---|---|---|---|
| 0.48 | x3' | 0.49383 | | | | |
| 0.45 | x3' | | 0.38935 | 0.41839 | 0.44742 | 0.47645 |
| 0.5 | x3' | | 0.45102 | 0.47580 | 0.50058 | 0.52536 |
| 0.55 | x3' | | 0.50147 | 0.52277 | 0.54407 | 0.56537 |

Summarizing the above calculations, the coordinates for the winglet sail section L.E. and T.E. lines are:

TABLE 14

| Winglet T.E. Shape Developed Lines, Kr = 0.65, Kw = .48 | | | | |
|---|---|---|---|---|
| y" | x" | y" | x" | x0" |
| y0' | 0.00000 | 1.00000 | | |
| y3' | 0.34855 | 0.97227 | 0.34855 | 0.97227x3" |
| y4' | | | 0.86626 | 1.07303x4" |
| tip | | y4' | 0.86626 | 1.07303x4" |
| | | y4' | 0.86626 | 0.84303x4' |

Calculation for the Transition Section Leading Edge are based on the above specified geometry and the values for Kw. From these values we can determine the above coefficients, B3, A3, A4, B5, and C5 needed to define the transition section LE, These calculations are summarized in the following table for sample values of Kr and Kw:

TABLE 15

| Kr | 0.4 | 0.5 | 0.6 | 0.7 | |
|---|---|---|---|---|---|
| R1 | 0.19663 | 0.24579 | 0.29495 | 0.34411 | |
| Kw 0.45 | | | | | |
| x3' | 0.18907 | 0.23634 | 0.28361 | 0.33087 | see table 12 or 13 |
| x4' | | | | | see table 11 |
| B3 | 0.38935 | 0.41839 | 0.44742 | 0.51779 | B3 = (x3' − x2' + C3*(y2'^2 − y3'^2))/(y3' − y2') |
| A3 | 0.81130 | 0.81123 | 0.81116 | 0.85243 | A3 = x2' − C3*y2'^2 − B3*y2' |
| A4 | 4.59631 | 3.95941 | 3.53481 | 3.50683 | A4 = x3' − B4*y3' |
| B5 | −0.31298 | −0.28877 | −0.26456 | −0.30235 | B5 = (x3'' − Ctip)/y3' − (tan(gammaW − gammaB)/2 |
| C5 | 0.24467 | 0.23754 | 0.23040 | 0.26460 | C5 = (tan(gammaW) − tan(gammaB))/(2*y3') |
| | −0.12601 | −0.19557 | −0.24867 | −0.29385 | |
| Kw 0.5 | 0.718193 | 0.625344 | 0.570217 | 0.538159 | |
| x3' | | | | | see table 12 or 13 |
| x4' | | | | | see table 11 |
| B3 | 0.45102 | 0.47580 | 0.50058 | 0.52536 | B3 = (x3' − x2' + C3*(y2'^2 − y3'^2))/(y3' − y2') |
| A3 | 0.87297 | 0.86865 | 0.86432 | 0.86000 | A3 = x2' − C3*y2'^2 − B3*y2' |
| A4 | 5.31505 | 4.49475 | 3.94788 | 3.55726 | A4 = x3' − B4*y3' |
| B5 | −0.40548 | −0.37489 | −0.34430 | −0.31371 | B5 = (x3'' − Ctip)/y3' − (tan(gammaW − gammaB)/2 |
| C5 | 0.30634 | 0.29495 | 0.28356 | 0.27217 | C5 = (tan(gammaW) − tan(gammaB))/(2*y3') |
| | −0.1753 | −0.24486 | −0.29796 | −0.34314 | |
| Kw 0.55 | 0.947983 | 0.809176 | 0.72341 | 0.669468 | |
| x3' | | | | | see table 12 or 13 |
| x4' | | | | | see table 11 |
| B3 | 0.50147 | 0.52277 | 0.54407 | 0.56537 | B3 = (x3' − x2' + C3*(y2'^2 − y3'^2))/(y3' − y2') |
| A3 | 0.92342 | 0.91562 | 0.90782 | 0.90002 | A3 = x2' − C3*y2'^2 − B3*y2' |
| A4 | 5.90311 | 4.93275 | 4.28584 | 3.82377 | A4 = x3' − B4*y3' |
| B5 | −0.48116 | −0.44535 | −0.40954 | −0.37373 | B5 = (x3'' − Ctip)/y3' − (tan(gammaW − gammaB)/2 |
| C5 | 0.35680 | 0.34193 | 0.32706 | 0.31219 | C5 = (tan(gammaW) − tan(gammaB))/(2*y3') |

For the values of Kr—0.65, and Kw=0.48 selected for the Aerostar Winglet design, the developed coordinates (as a ratio of the wing root chord, Ctip) to for the transition section are:

Table 16

| h | 0.78 | |
| phi | 15 | |
| beta | 65 | |
| Kr | 0.65 | |
| R1 | 0.30724 | |
| y3' | 0.34855 | y3' = R1*(beta)/57.2958 |
| y2' | 0.20913 | y2' = D2*y3' |
| y1' | 0.08714 | y1' = D1*y3' |
| y4' | 0.86626 | see table 12 |
| B1 | 9.93852 | B1 = (B2 − A1)/(2*y1') |
| x1' | 0.07546 | x1' = A1*y1' + B1*y1'^2 |
| A2 | −0.07546 | A2 = x1' − B2*y1' |
| x2' | 0.28676 | x2' = A2 + B2*y2' |
| C3 | −3.79262 | C3 = (B4 − B2)/(2*(y3' − y2')) |
| Kw | 0.48 | |
| x3' | 0.49383 | see table 12 or 13 |
| x4' | 0.84303 | see table 11 |
| B3 | 3.60028 | B3 = (x3' − x2' + C3*(y2'^2 − y3'^2))/(y3' − y2') |
| A3 | −0.30030 | A3 = x2' − C3*y2'^2 − B3*y2' |
| A4 | 0.25873 | A4 = x3' − B4*y3' |
| B5 | −0.3027 | B5 = (x3' − Ctip)/y3' − (tan(gammaW − gammaB)/2 |
| C5 | 0.640227 | C5 = (tan(gammaW) − tan(gammaB))/(2*y3') |

Summarizing the above calculations, the developed coordinates (as a ratio to the wing tip chord, Ctip) defining the shape of the winglet are:

TABLE 17

Winglet L.E. Shape Developed Curves for Kr = 0.65, Kw = 0.48
Ctip = 1

| | Segment 1 0.030208 | | Segment 2 0.042291 | | Segment 3 0.029 | | Segment 4 | |
|---|---|---|---|---|---|---|---|---|
| | y' | x' | y' | x' | y' | x' | y' | x' |
| Segment 1 | 0 | 0 | | | | | | |
| 0 < x < x1 | 0.029046 | 0.008385 | | | | | | |
| | 0.058092 | 0.03354 | | | | | | |
| Segment 2 | 0.087138 | 0.075464 | 0.087138 | 0.0754639 | | | | |
| x1 < x < x2 | | | 0.127803 | 0.1458969 | | | | |
| | | | 0.168467 | 0.2163299 | | | | |
| Segment 3 | | | 0.209132 | 0.2867629 | 0.209132 | 0.286763 | | |
| x2 < x < x3 | | | | | 0.237016 | 0.339972 | | |
| | | | | | 0.2649 | 0.387283 | | |

TABLE 17-continued

| Winglet L.E. Shape Developed Curves for Kr = 0.65, Kw = 0.48 |
| Ctip = 1 |

| | Segment 1 0.030208 | | Segment 2 0.042291 | | Segment 3 0.029 | | Segment 4 | |
|---|---|---|---|---|---|---|---|---|
| | y' | x' | y' | x' | y' | x' | y' | x' |
| | | | | | 0.292784 | 0.428697 | | |
| | | | | | 0.320669 | 0.464212 | | |
| Segment 4 | | | | | 0.348553 | 0.49383 | 0.348553 | 0.49383 |
| x3 < x < x4 | | | | | | | 0.86626 | 0.843027 |

It is also necessary to define the winglet trailing edge curve blend between the wing trailing edge and the winglet sail section. A sample fillet curve is calculated as follows:
Winglet T.E. Fillet Curve
Segment 1-3
slope of Wing T.E.=tan(gammaB)
Winglet Sail Section T.E. Line Slope=tan(gammaW)
for $(0<=y'<=y3')$ $$x''=A5+B5*y'+C5*y'^2$$

at $y'=0, x''=C$tip at $y'=y3', x''=x3''$ $$dx''/dy'=B5+2*C5*y'$$

at $y'=0, dx'/dy'=\tan(gammaB)$ at $y'=y3', dx''/dy'=\tan(gammaW)$ $$\tan(gammaB)=\tan(gamma(W)-2*C5*y3'$$

$$C5=(\tan(gammaW)-\tan(gammaB))/(2*y3')$$

substituting into $x3''=A5+B5*y3'+C5*y3'^2$ $$B5=(x''3-C5*y3'^2)/y3'$$

$$B5=(x3''-A5)/y3'-(\tan(gammaW-gammaB)/2$$

Based on the selected geometry, the winglet sail section I.E. line segment equation is:
Segment 4×

$$x3<x<x4$$

Sail T.E. Line Equation 0.10075dx=x'4+Cw_tip-x''3

0.51770dy=y'4-y'3

0.194617 Slope=$dx/dy$ 0.904439 intercept=-($dx/dy$)*y'3+x''3

And the developed coordinates (as a ratio to the wing tip chord, Ctip) for the winglet trailing edge fillet are:

TABLE 18

| Winglet T.E. Fillet and Line Ctip = 1 |
| Segments 1-3 |

| y' | x'' | |
|---|---|---|
| 0 | 1 | (y'0, x''0) |
| 0.029046 | 0.991748 | |
| 0.058092 | 0.984576 | |
| 0.087138 | 0.978484 | |
| 0.127803 | 0.971771 | |
| 0.168467 | 0.967175 | |
| 0.209132 | 0.964696 | |
| 0.237016 | 0.96422 | |
| 0.2649 | 0.96474 | |
| 0.292784 | 0.966255 | |
| 0.320669 | 0.968766 | |
| 0.348553 | 0.972273 | (y'3, x''3) |
| 0.86626 | 1.073027 | (y'4, x''4) |

Figure 27:
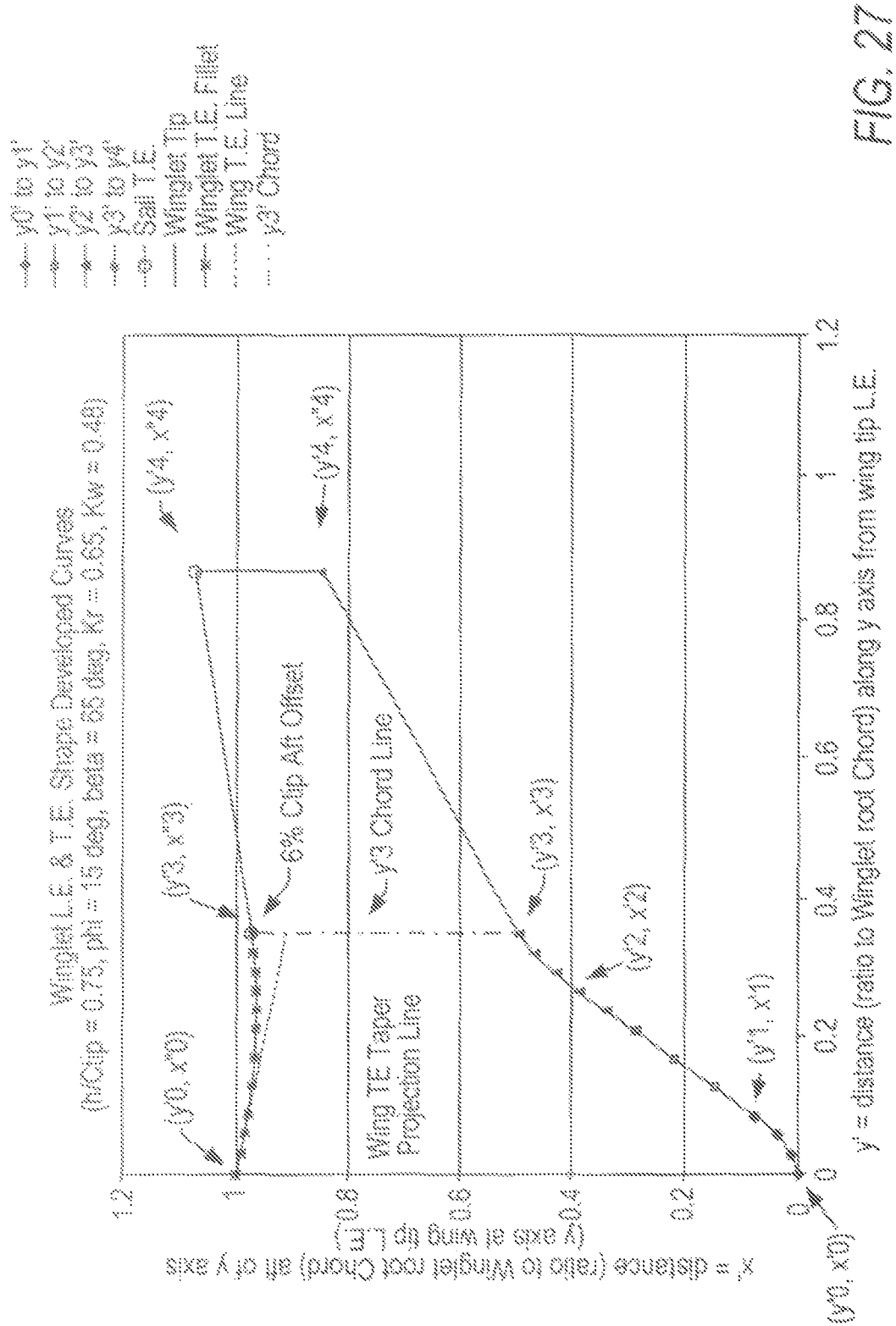
FIG. 27 shows the shape development curves for an Aerostar 600/700 Series aircraft.

Graphically, the winglet plan form or developed contour is illustrated in FIG. 27. Multiplying the values in Tables 15 and 16 by the reference wing tip chord length, Ctip=32.7 inches, give the following winglet design plan form or developed coordinate dimensions in inches:

TABLE 19

| Winglet L.E. Shape Developed Curves for Kr = 0.65, Kw = 0.48 |
| Ctip = 32.7 inches |

| | Segment 1 | | Segment 2 | | Segment 3 | | Segment 4 | |
|---|---|---|---|---|---|---|---|---|
| | y' | x' | y' | x' | y' | x' | y' | x' |
| Segment 1 | 0.000 | 0.000 | | | | | | |
| 0 < x < x1 | 0.950 | 0.274 | | | | | | |
| | 1.900 | 1.097 | | | | | | |
| Segment 2 | 2.849 | 2.468 | 2.849 | 2.468 | | | | |
| x1 < x < x2 | | | 4.179 | 4.771 | | | | |
| | | | 5.509 | 7.074 | | | | |
| Segment 3 | | | 6.839 | 9.377 | 6.839 | 9.377 | | |
| x2 < x < x3 | | | | | 7.750 | 11.117 | | |
| | | | | | 8.662 | 12.664 | | |
| | | | | | 9.574 | 14.018 | | |

TABLE 19-continued

Winglet L.E. Shape Developed Curves for Kr = 0.65, Kw = 0.48
Ctip = 32.7 inches

| | Segment 1 | | Segment 2 | | Segment 3 | | Segment 4 | |
|---|---|---|---|---|---|---|---|---|
| | y' | x' | y' | x' | y' | x' | y' | x' |
| Segment 4 x3 < x < x4 | | | | | 10.486<br>11.398 | 15.180<br>16.148 | 11.398<br>28.327 | 16.148<br>27.567 |

TABLE 20

Winglet T.E. Fillet and Line Ctip = 32.7
Segments 1-3

| y' | x" | |
|---|---|---|
| 0.000 | 32.700 | (y'0, x"0) |
| 0.950 | 32.430 | |
| 1.900 | 32.196 | |
| 2.849 | 31.996 | |
| 4.179 | 31.777 | |
| 5.509 | 31.627 | |
| 6.839 | 31.546 | |
| 7.750 | 31.530 | |
| 8.662 | 31.547 | |
| 9.574 | 31.597 | |
| 10.486 | 31.679 | |
| 11.398 | 31.793 | (y'3, x"3) |
| 28.327 | 35.088 | (y'4, x"4) |

Figure 21:
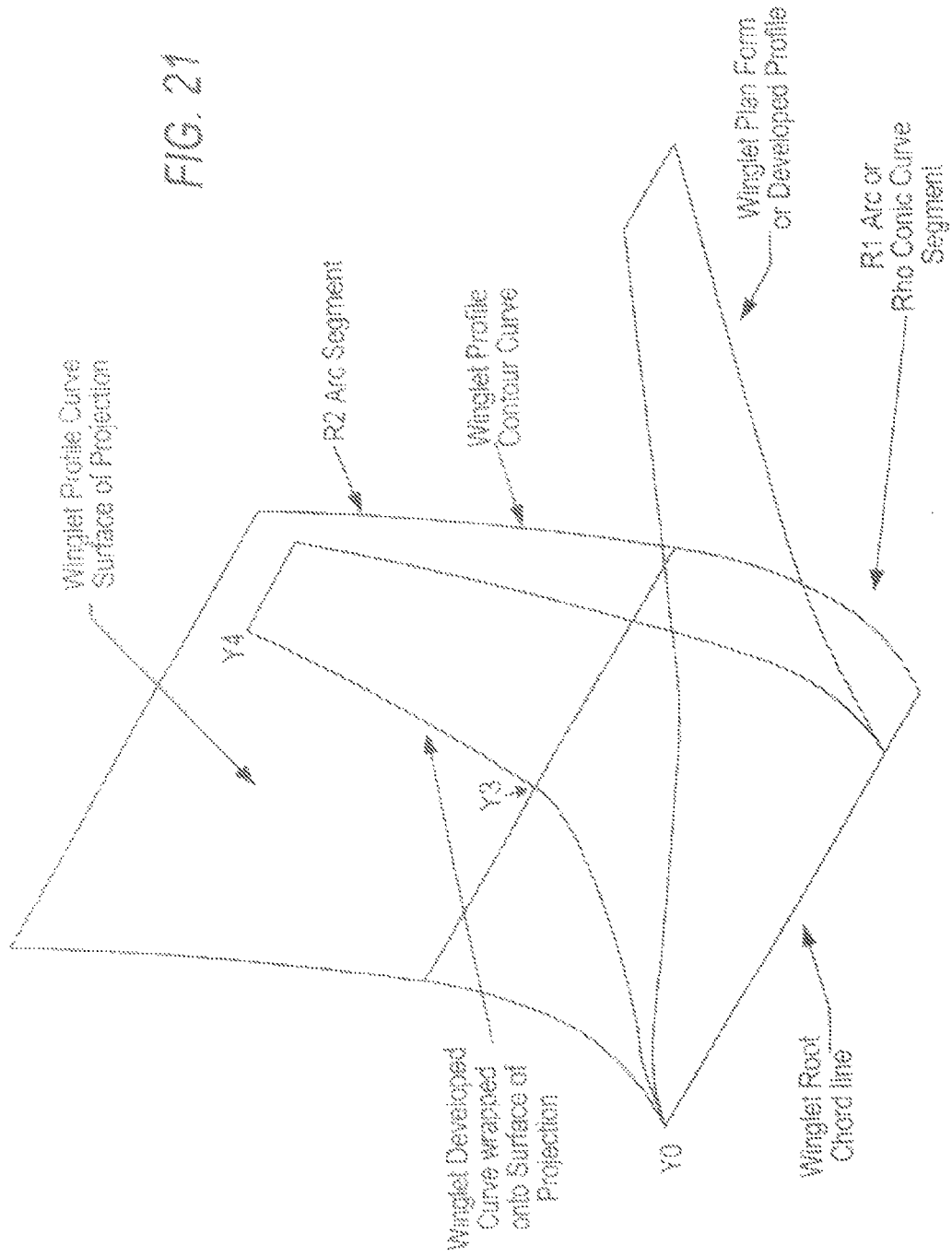
FIG. 21 is an isometric view showing the winglet plan form curves wrapped onto the winglet profile curve surface of projection.
Figure 22:
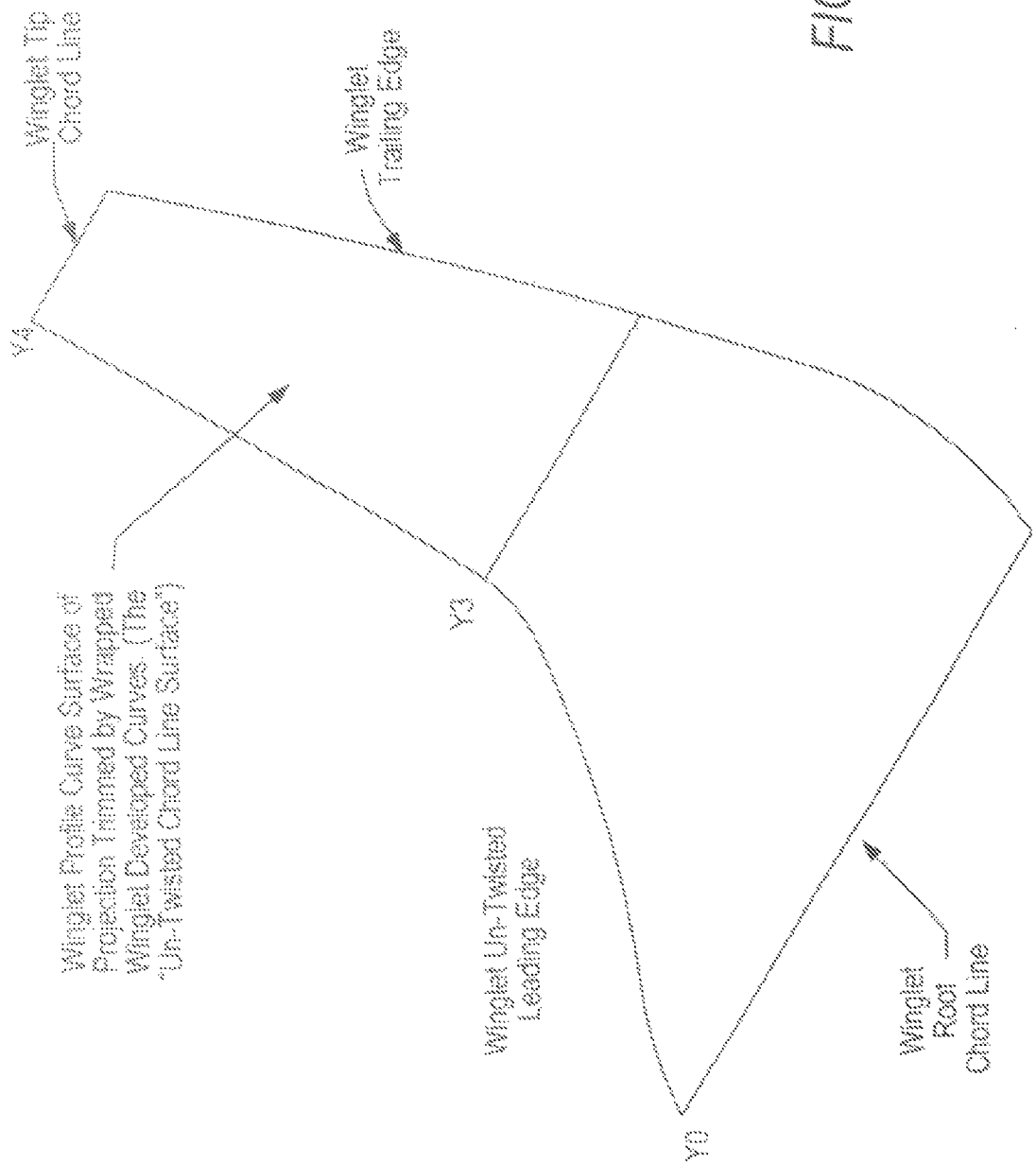
FIG. 22 is the view of FIG. 20 wherein the winglet profile curve surface of projection is trimmed by the wrapped winglet plan form curves.
Figure 23:
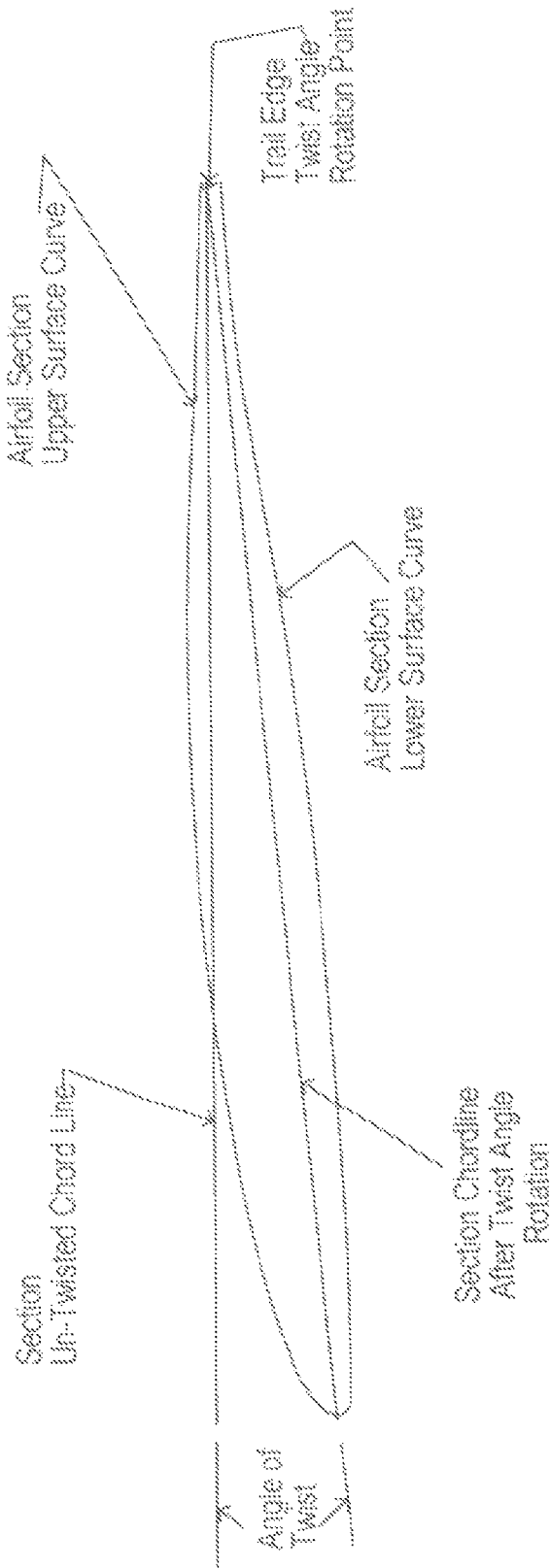
FIG. 23 is a typical winglet airfoil cross-section using a plane that is normal to the surface shown in FIG. 22 and normal to the wing yz plane. This figure shows the angle of twist about the section trailing edge point relative to the section untwisted chord line (line of intersection between the surface of FIG. 22, and the airfoil cross-section plane).

Once the winglet profile contour curve has been created, a surface is generated by extruding or projecting this curve along the wing tip chord line see FIG. 21. The plan form or developed curves are then wrapped on to this projected surface with the winglet root chord line (y'0,x'0 to y'0,x"0) coincident with the wing tip chord line and the winglet root leading edge point coincident with the wing tip leading edge point. The projected surface is then trimmed by the wrapped curves creating a surface which is the locus of the un-twisted winglet airfoil chord lines, see FIG. 22. This surface shall be referred to as winglet's un-twisted airfoil chord line surface.

Figure 24:
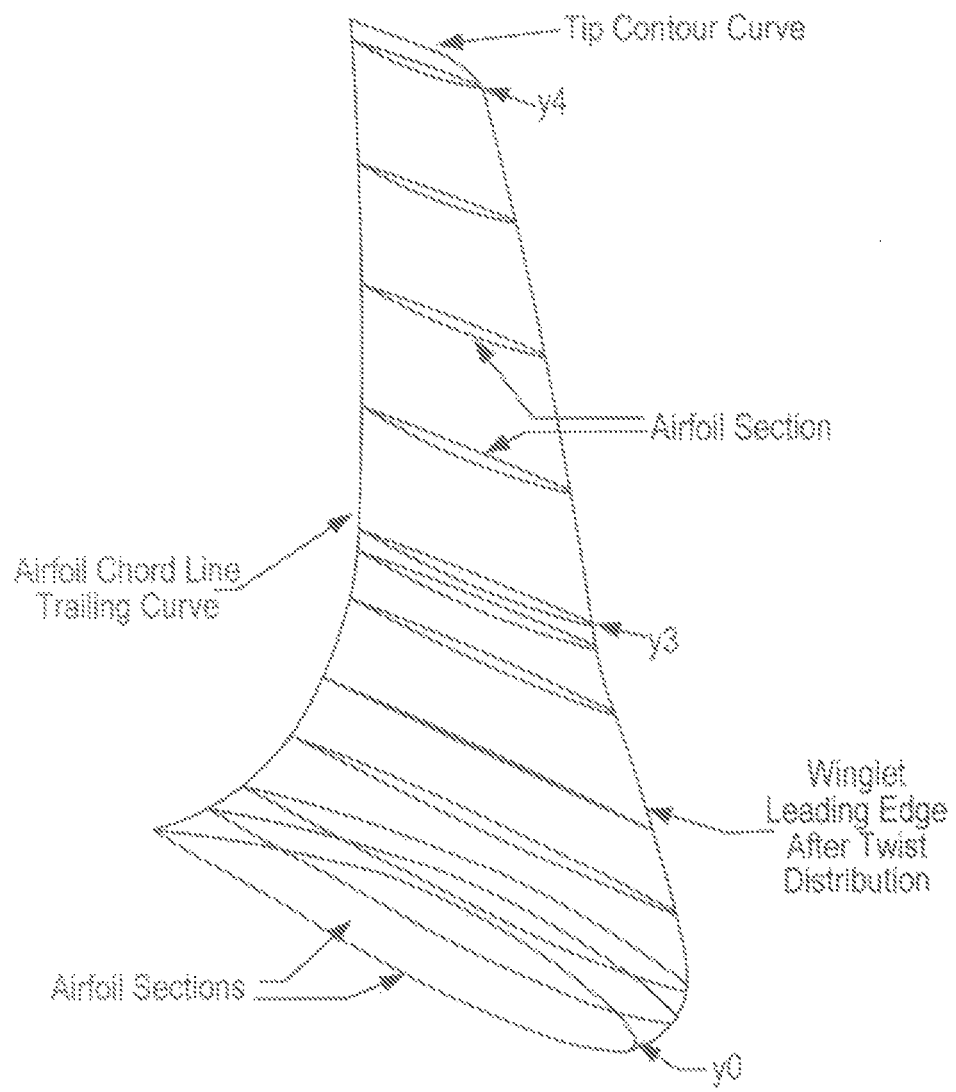
FIG. 24 is an isometric view of a left wing winglet, showing selected airfoil sections along the span of the winglet.

Airfoil sections now need to be defined and located to generate the winglet surfaces, see FIG. 24. To accomplish this, construction planes perpendicular to both this un-twisted airfoil chord line surface and the winglet root chord line are placed at the desired points along the aft edge of the un-twisted airfoil chord line surface which is also now the winglet trailing edge curve. Airfoil section created as previously described herein are then placed in these construction planes with the airfoil chord line trailing edge point positioned at the point of intersection between the construction plane and winglet trailing edge curve, and the airfoil chord line leading edge point positioned at the point of intersection between the construction plane and the forward edge of the un-twisted airfoil chord line surface which is also now the winglet un-twisted leading edge curve. To align each airfoil at the desired angle of attach to the localized air low direction, each airfoil section is rotated (angle of twist) about its chord trailing edge point, see FIG. 23. With this procedure, the projection of the trailing edge curve maintains the desired winglet profile shape described herein. Although less desirable, the twist rotation angles could be performed about the un-twisted chord surface leading edge points wherein the projection of the winglet leading edge would conform to the desired winglet profile shape described herein. The desired winglet surfaces are then obtained by creating surfaces that pass through each of the airfoil sections, the after twist leading and trailing edge curves, see FIG. 24. Other curves passing through each airfoil section may also be used during the surface creation to improve surface smoothness. The generated winglet surfaces also need to maintain tangency with the adjoining wing surface at the wing tip to winglet attachment location. Winglet tip contour curves may also be added, which will slightly increase the winglet overall height, to control the shape of the winglet tip blend surfaces connecting the winglet upper and lower surfaces.

The Aerostar wing utilizes the NAGA 64A-212 airfoil. For the Aerostar winglet design, the airfoil selected for the winglet sail section (y3 to y4) was the AMI-1 airfoil. The Whitcomb Mod GA(W-2) airfoil was also analyzed, but the AMI-1 airfoil provided superior performance. The airfoils used in the winglet transition section were a proportional blend between the NACA 64A-212 and the AMI-1 airfoils as described herein.

Changes to aerodynamic loading of the winglet can be accomplished by selecting different airfoils shapes. For example, thinner airfoils generally have less drag, airfoils with more camber generally produce more lift. But more lift produced more induced drag which can offset the effectiveness of winglet to reduce the aircraft's drag. Thus, the designer must select airfoil sections that provide optimal overall performance for the winglet. Another factor affecting aerodynamic loading of the winglet is the winglet span wise airfoil twist distribution. Generally, the higher the relative angle of attack for the airflow over a specific airfoil section, the greater the lift (and induced drag) at that section. However, if the angle of twist results in to large of an angle of attach, flow over the airfoil section could separate causing the winglet to buffet or stall. The airflow at the wing tip produces a vortex wake, thus the flow field is complex. The goal of the winglet designer is to create a winglet shape that achieves optimal (minimum) circulation in the wake for a given wing plan form design. This is best accomplished using computational fluid dynamics computer analysis where the optimal design is achieved through a process of iteration by changing the winglet's design elements. The concepts and procedures outlined herein are intended to focus these design elements toward optimal performance.

The illustrated embodiments provided herein are only examples of the present invention. It is to be understood that many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. A wing for an aircraft, the wing forming an airfoil and comprising:

an inner end, and outer end, an upper surface, a lower surface, a leading edge, and a trailing edge; and a winglet having an inner end, an outer end tip, an upper surface, a lower surface, a leading edge and a trailing edge;

wherein the inner end, or root, of said winglet is connected to the outer end of said wing, and the upper and lower surfaces of the winglet and the leading and trailing edges of the winglet are continuations of the upper and lower surfaces of the wing and leading and trailing edges of the wing, respectively; the winglet having a transition region and a sail section, the transition region extending from the outer end oft wing the sail section and the sail section extending from the end of the transition region to the winglet end tip;

such that the leading and trailing edges of the winglet each have a profile that defines at least two curves along each of their entire length, from their inner end at the root of the winglet, to the outer end of the tip of the winglet;

wherein the curves defining the winglet edge profile at any point are generated through a locus of points projected onto a plane substantially normal to the winglet inner end, or root, chord line, and conforms to the following criteria;

the lower end of the profile curve is approximately tangent to the wing reference plane at the junction of the winglet to the outer end of the wing;

each profile curve is approximately monotonic, with constantly increasing radius of curvature from the curve lower end to the curve upper end;

the upper end point of the profile curve, at the winglet end tip, is tangent to a line parallel with a line oriented at the cant angle, phi, at the winglet end tip;

the upper end point of the lower profile curve is positioned at a height above the wing reference plane having a value of between 65 percent and 105 percent of the wing outer end chord length;

the location of the upper end of the transitions section, or start or lower end of the sail section, is positioned at a specified distance along the length of said alternate curve form measured from the lower end of the curve; and the winglet profile curve from root to tip excludes both a single conic curve and the combination of a lower are segment connected and tangent to an upper linear segment.

2. The wing for an aircraft of claim 1, wherein the locus of points defining the curve to be projected lie along the winglet trailing edge curve (100 percent section chord locations).

3. The wing for an aircraft of claim 1 wherein the locus of points defining the curve to be projected lie along the winglet leading edge curve (0 percent section chord locations).

4. An aircraft of claim 1 wherein the profile curve is a composite curve comprised of a lower rho conic curve segment connected and tangent to an upper arc segment curve.

5. The wing for an aircraft of claim 4 wherein the curve length of the rho conic curve segment is substantially the same as the are curve length of the are having a radius, R1 over an angle equal to Beta, where Beta is the design arc segment angle specifying the upper end point location of the lower arc segment measured from the curve lower or root end and the wing tip XZ-plane.

6. The wing for an aircraft of claim 1, wherein the profile is a composite curve comprised of a lower a rho conic curve segment connected and tangent to an second or upper rho conic segment curve, wherein the rho value of the lower segment curve is greater than the rho value of the upper segment curve.

7. A wing for an aircraft, the wing comprising:

an inner end, and outer end, an upper surface, a lower surface, a leading edge, and a trailing edge; and a winglet having an inner end, an outer end tip, an upper surface, a lower surface, a leading edge and a trailing edge;

wherein the inner end of said winglet is connected to the outer end of said wing, and the upper and lower surfaces of the winglet and the leading and trailing edges of the winglet are continuations of the upper and lower surfaces of the wing and leading and trailing edges of the wing, respectively;

such that said winglet edge profile always defines a curve as it extends from its inner end to its outer end tip;

wherein a curve defining the winglet profile is generated through a locus of points of constant percent chord positions on airfoil section chord lines or extensions thereof, such that each profile curve is approximately monotonic, with constantly increasing radius of curvature from the curve lower end to the curve upper end;

the upper end of the profile curve, at the winglet end tip, is tangent to a line parallel with a line oriented at the cant angle, phi, at the winglet end tip;

said winglet profile curve when projected onto a plane substantially normal to the winglet inner end, or root chord line, closely approximates a composite curve composed of two arc segments.

8. The aircraft of claim 7, wherein the radius defining the lower portion of the winglet's projected contour has a value less than the radius defining the upper portion of the winglet's projected contour and the arc center of the two arc segments are located inboard of the winglet upper portion.

9. The wing for an aircraft of claim 7, wherein the radius defining the lower portion of the winglet's projected contour has a value less than the radius defining the upper portion of the winglet's projected contour and the are center of the lower are segment is located at a point inboard of the winglet upper portion and the arc center of the upper arc segment is located at a point outboard of the winglet upper portion such that the winglet profile has a reflex in curvature at the junction of the two arc segments.

10. The wing for an aircraft of claim 7, wherein the two arc segments are tangent to each other at their point of connection, and the arc segment of the lower portion of the winglet connects to the outer end of the wing and is tangent with the wing's outer reference plane.

11. The wing for an aircraft of claim 10, wherein the a tangent line at the outer tip of the arc segment defining the upper portion profile of the winglet forms a cant angle of between 12 and 20 degrees to a plane that is both normal to the wing tip reference plane and is through the wing outer tip chord line.

12. The wing for an aircraft of claim 7, wherein the wing has a maximum aft sweep angle of less than 15 degrees, the are section radius of curvature, R1 for the lower portion of the winglet has a range in values defined by the following:

$$R1/h = Kr^* \cos(phi/2 + pi/4)/\cos(phi)$$

where:
Kr=curvature parameter, where 0.35<Kr<0.80
h=winglet height (distance normal to wing tip ref plane to winglet outer tip)
phi=cant angle of tangent line to upper are segment at winglet outer tip
pi=3.14159.

13. The wing of claim 7 wherein a curve defining the winglet profile is generated through a locus of section chord line leading edge points (0% chord line points).

14. The wing of claim 13 comprising a curve defining the winglet profile being generated through a locus of section chord line trailing edge points (100% chord line points).

* * * * *